(12) United States Patent
Lucas et al.

(10) Patent No.: US 9,163,967 B2
(45) Date of Patent: Oct. 20, 2015

(54) ELECTROMAGNETIC FLOW METER AND METHOD FOR MONITORING FLUID FLOW OF A CONDUCTING FLUID HAVING EITHER A UNIFORM OR A NON-UNIFORM FLOW PROFILE

(75) Inventors: Gary P. Lucas, Huddersfield (GB); Teerachai Leeungculsatien, Huddersfield (GB)

(73) Assignee: University of Huddersfield, West Yorkshire (GB)

(*) Notice: Subject to any disclaimer, the term of this patent is extended or adjusted under 35 U.S.C. 154(b) by 197 days.

(21) Appl. No.: 13/641,511

(22) PCT Filed: Apr. 18, 2011

(86) PCT No.: PCT/GB2011/000600
§ 371 (c)(1),
(2), (4) Date: Oct. 16, 2012

(87) PCT Pub. No.: WO2011/128656
PCT Pub. Date: Oct. 20, 2011

(65) Prior Publication Data
US 2013/0036817 A1    Feb. 14, 2013

(30) Foreign Application Priority Data
Apr. 17, 2010  (GB) .................................. 1006409.5

(51) Int. Cl.
*G01F 1/58* (2006.01)
*G01F 1/60* (2006.01)
*G01F 1/712* (2006.01)
*G01F 1/74* (2006.01)

(52) U.S. Cl.
CPC ............ *G01F 1/588* (2013.01); *G01F 1/60* (2013.01); *G01F 1/712* (2013.01); *G01F 1/74* (2013.01)

(58) Field of Classification Search
None
See application file for complete search history.

(56) References Cited

U.S. PATENT DOCUMENTS

| | | |
|---|---|---|
| 3,751,980 A | 8/1973 | Fryer |
| 3,924,466 A | 12/1975 | Medlar |
| 3,981,190 A | 9/1976 | Vidmantas |
| 4,059,014 A | 11/1977 | Torimaru |

(Continued)

OTHER PUBLICATIONS

Williams, E.J., "The Motion of a Liquid in an Enclosed Space," Phil. Mag, 1925, vol. 50, No. 27, pp. 479-487.

(Continued)

*Primary Examiner* — Harshad R Patel
(74) *Attorney, Agent, or Firm* — Michael Best & Friedrich LLP

(57) ABSTRACT

An electromagnetic flow meter and method for monitoring the flow of a fluid is provided. In particular, the electromagnetic flow meter and method measure the axial velocity profile of a conducting fluid. The conducting fluid may be a conducting single phase fluid or a conducting continuous phase of a multiphase fluid. The conducting fluid may have a uniform flow profile or a non-uniform flow profile. The electromagnetic flow meter and method measure the axial velocity profile of a conducting fluid by dividing the flow cross section into multiple pixels and determining the axial velocity of the conducting fluid in each pixel. Having derived the axial velocity profile, the electromagnetic flow meter and method may further derive the volumetric flow rate of the conducting fluid. The electromagnetic flow meter and method may be suitable for measuring the axial velocity profile and optionally the volumetric flow rates of each phase of a multiphase fluid.

40 Claims, 16 Drawing Sheets

(56) References Cited

U.S. PATENT DOCUMENTS

| | | | |
|---|---|---|---|
| 4,167,871 A | | 9/1979 | Shauger et al. |
| 4,269,071 A | | 5/1981 | Wada |
| 4,543,822 A | * | 10/1985 | Sorrell et al. ............. 73/170.29 |
| 4,614,121 A | | 9/1986 | Hansen et al. |
| 4,727,754 A | * | 3/1988 | Ruckel ....................... 73/861.12 |
| 4,736,635 A | * | 4/1988 | Murase ....................... 73/861.15 |
| 5,263,374 A | * | 11/1993 | Marsh ........................ 73/861.15 |
| 5,275,059 A | | 1/1994 | Lew et al. |
| 5,388,465 A | | 2/1995 | Okaniwa et al. |
| 5,421,210 A | * | 6/1995 | Kobayashi et al. ......... 73/861.12 |
| 5,693,891 A | | 12/1997 | Brown et al. |
| 5,880,376 A | | 3/1999 | Sai et al. |
| 6,094,992 A | * | 8/2000 | Mesch et al. .............. 73/861.15 |
| 6,237,424 B1 | | 5/2001 | Salmasi et al. |
| 6,505,517 B1 | | 1/2003 | Eryurek et al. |
| 6,539,981 B1 | | 4/2003 | Kleven et al. |
| 6,571,642 B1 | | 6/2003 | Feller |
| 6,611,770 B1 | | 8/2003 | O'Donnell et al. |
| 6,697,742 B1 | | 2/2004 | Franklin et al. |
| 6,708,569 B2 | | 3/2004 | Budmiger |
| 6,711,947 B2 | * | 3/2004 | Maute ....................... 73/152.29 |
| 6,763,729 B1 | | 7/2004 | Matzen |
| 6,779,407 B2 | * | 8/2004 | Maute ....................... 73/861.12 |
| 6,789,432 B2 | | 9/2004 | Guazzoni et al. |
| 6,817,249 B2 | | 11/2004 | Yamazaki |
| 6,843,137 B2 | | 1/2005 | Keech |
| 6,920,799 B1 | | 7/2005 | Schulz |
| 6,971,271 B2 | * | 12/2005 | Maute ....................... 73/861.12 |
| 6,983,661 B2 | | 1/2006 | Zingg |
| 7,412,901 B2 | | 8/2008 | Baecker et al. |
| 7,503,227 B2 | * | 3/2009 | Davis et al. ................ 73/861.42 |
| 7,509,852 B2 | * | 3/2009 | Maute ....................... 73/152.29 |
| 7,574,907 B2 | * | 8/2009 | Maute ....................... 73/152.29 |
| 7,587,947 B1 | | 9/2009 | Feller |
| 2002/0050175 A1 | * | 5/2002 | Feller ....................... 73/861.12 |
| 2002/0189337 A1 | * | 12/2002 | Maute ....................... 73/152.19 |
| 2004/0083804 A1 | * | 5/2004 | Maute ....................... 73/152.29 |
| 2005/0028608 A1 | * | 2/2005 | Maute ....................... 73/861.15 |
| 2005/0268730 A1 | | 12/2005 | Yasumatsu |
| 2006/0037388 A1 | * | 2/2006 | Maute ....................... 73/152.29 |
| 2008/0022763 A1 | * | 1/2008 | Maute ....................... 73/152.29 |
| 2009/0178476 A1 | * | 7/2009 | Maute ....................... 73/152.29 |
| 2009/0266155 A1 | * | 10/2009 | Maute ....................... 73/152.29 |
| 2010/0122582 A1 | * | 5/2010 | Hencken et al. ........... 73/861.15 |

OTHER PUBLICATIONS

Shercliff, J.A. et al., "Experiments on the dependence of sensitivity on velocity profile in electromagnetic flowmeters," Journal of Scientific Instruments, Nov. 1955, vol. 32, pp. 441-442.

Bevir, M.K., "Long Induced Voltage Electromagnetic Flowmeters and the Effect of Velocity Profile," Quart. Journ. Mech. And Applied Math, 1971, vol. XXIV, Pt. 3, pp. 347-372.

Hemp, J., "Improved magnetic field for an electromagnetic flowmeter with point electrodes," J. Phys. D: Appl. Phys., 1975, vol. 8, pp. 983-1002.

Kanwisher, J. et al., "Electromagnetic flow sensors," Limnology and Oceanography, Match 1975, vol. 20(2), pp. 174-182.

O'Sullivan, V.T., "Performance of an electromagnetic flowmeter with six point electrodes," J Phys. E: Sci. Instrum., 1983, vol. 16, pp. 1183-1188.

Horner, B., "A novel profile-insensitive multi-electrode induction flowmeter suitable for industrial use," Measurement, 1998, vol. 24, pp. 131-137.

Amare, T., "Design of an electromagnetic flowmeter for insulating liquids," Meas. Sci. Technol., 1999 ,vol. 10, pp. 755-758.

Cha, J. et al., "Flow measurement with an electromagnetic flowmeter in two-phase bubbly and slug flow regimes," Flow Measurement and Instrumentation, 2002, vol. 12, pp. 329-339.

Hofmann, F., "Fundamental principles of Electromagnetic Flow Measurement," Krohne Messtechnik GmbH & Co. KG, Duisburg, 2003, 71 pages.

Tschopp, D., "High measuring performance of Endress + Hauser PROline Promag Electromagnetic Flowmeters," Endress + Hauser, 30 Apr. 2004, 9 pages.

Zhang, X. et al., "Calculation of the virtual current in an electromagnetic flow meter with one bubble using 3D model," ISA Transactions, 2004, vol. 43, pp. 189-194.

Schukat, M. et al., "A New Approach to Signal Processing for Dc-Electromagnetic Flowmeters," Proceedings of World Academy of Science, Engineering and Technology, Jan. 2, 2005, vol. 2, pp. 173-176.

Cvetkovic, D. et al., "Modelling and Design of Extremely Low Frequency Uniform Magnetic Field Exposure Apparatus for in Vivo Bioelectromagnetic Studies," Proceedings of the 29th Annual International, Conference of the IEEE EMBS, CitéInternationale, Lyon, France, Aug. 23-26, 2007, pp. 1675-1678.

Wang, J. et al., "Simulation of magnetic field distribution of excitation coil for EM flow meter and its validation using magnetic camera," 17th World Conference on Nondestructive Testing, Shanghai, China, Oct. 25-28, 2008, 6 pp.

Sharma, V. et al., "Sensitivity Estimation of Permanent Magnet Flowmeter," Excerpt from the Proceedings of the COMSOL Conference 2009 Bangalore, 6 pages.

Horner, B. et al., "An Induction Flowmeter Insensitive to Asymmetric Flow Profiles," Process tomography 1995, Apr. 6-8, 1995, 10 pages.

Horner, B. et al., "A multi-sensor induction flowmeter reducing errors due to non-axisymmetric flow profiles," Meas. Sci. Technol., 1996, vol. 7, pp. 354-360.

Katoh, T. et al., "3D flow tomography with electromagnetic flowmeter," Proceedings of the Sice Annual Conference, SICE, Aug. 4-6, 2003, pp. 1314-1319.

Katoh, T. et al., "3D flow tomography with Electromagnetic Flowmeter," SICE 2002, Osaka, Aug. 5-7, 2002, pp. 535-538.

Krause, J., "Electromagnetic Flow Metering," Modelling and Simulation, I-Tech Education and Publishing, Jun. 2008, Chapter 10, pp. 165-186.

Teshima, T. et al., "Electromagnetic Flowmete with Multiple Poles and Electrodes," IMTC '94, May 10-12, 1994, pp. 1221-1224.

Cha, J. et al., "The Performance of Electromagnetic Flowmeters in a Liquid Metal Two-Phase Flow," Journal of Nuclear Science and Technology, Oct. 2003, vol. 40, No. 10, p. 744-753.

Leeungculsatien, "Novel Multi-Electrode Electromagnetic Flow Meter," Research Festival, Apr. 2, 2009, pp. 1-1, XP55002449, Retrieved from Internet <URL:http:Ileprints.hud.ac.ukll/Novel_Mutli% 20Electrode_Electronnagnetic_Flow_Meter%20_Teerachai_Leeungculsatien.pdf>.

Wang et al., "Relationship between velocity profile and distribution of induced potential for an electromagnetic flow meter," Flow Measurement and Instrumentation Butterwoth-Heinemann, Oxford, GB, May 9, 2007, vol. 18, No. 2, pp. 99-105, XP022066395, ISSN 0955-5986.

Razzak et al., "Electrical resistance tomography for flow characterization of a gas-liquid-solid three-phase circulating fluidized bed," Chemical Engineering Science, Oxford, GB, 22 Nov. 2007, vol. 62, No. 24, pp. 7253-7263, XP022357542, ISSN: 0009-2509.

International Search Report for Application No. PCT/GB2011/000600 dated Aug. 9, 2011 (3 pages).

* cited by examiner

Table showing how the pixels relate to the electrode pairs and potential difference measurements

| Pixel1 (i=1) | Pair 1 (j=1) | e4 - e6 | $U_1$ |
|---|---|---|---|
| Pixel2 (i=2) | Pair 2 (j=2) | e3 - e7 | $U_2$ |
| Pixel3 (i=3) | Pair 3 (j=3) | e2 - e8 | $U_3$ |
| Pixel4 (i=4) | Pair 4 (j=4) | e1 - e9 | $U_4$ |
| Pixel5 (i=5) | Pair 5 (j=5) | e16 - e10 | $U_5$ |
| Pixel6 (i=6) | Pair 6 (j=6) | e15 - e11 | $U_6$ |
| Pixel7 (i=7) | Pair 7 (j=7) | e14 - e12 | $U_7$ |

Electromagnetic flow meter geometries

| Area $A_i$ (m²) | | Electrode pair $U_j$ | |
|---|---|---|---|
| Pixel1 (i=1) | $1.738e^{-4}$ | Pair 1 (j=1) | e4 - e6 |
| Pixel2 (i=2) | $1.267e^{-4}$ | Pair 2 (j=2) | e3 - e7 |
| Pixel3 (i=3) | $1.077e^{-3}$ | Pair 3 (j=3) | e2 - e8 |
| Pixel4 (i=4) | $1.264e^{-3}$ | Pair 4 (j=4) | e1 - e9 |
| Pixel5 (i=5) | $1.077e^{-3}$ | Pair 5 (j=5) | e16 - e10 |
| Pixel6 (i=6) | $1.267e^{-4}$ | Pair 6 (j=6) | e15 - e11 |
| Pixel7 (i=7) | $1.738e^{-4}$ | Pair 7 (j=7) | e14 - e12 |
| Pixel areas | | Electrode pair | |

Electrical potential [V]
on z plane

Distribution of Lorentz force
per unit volume [N/m³]

Induced Voltage Distribution

Weight Values

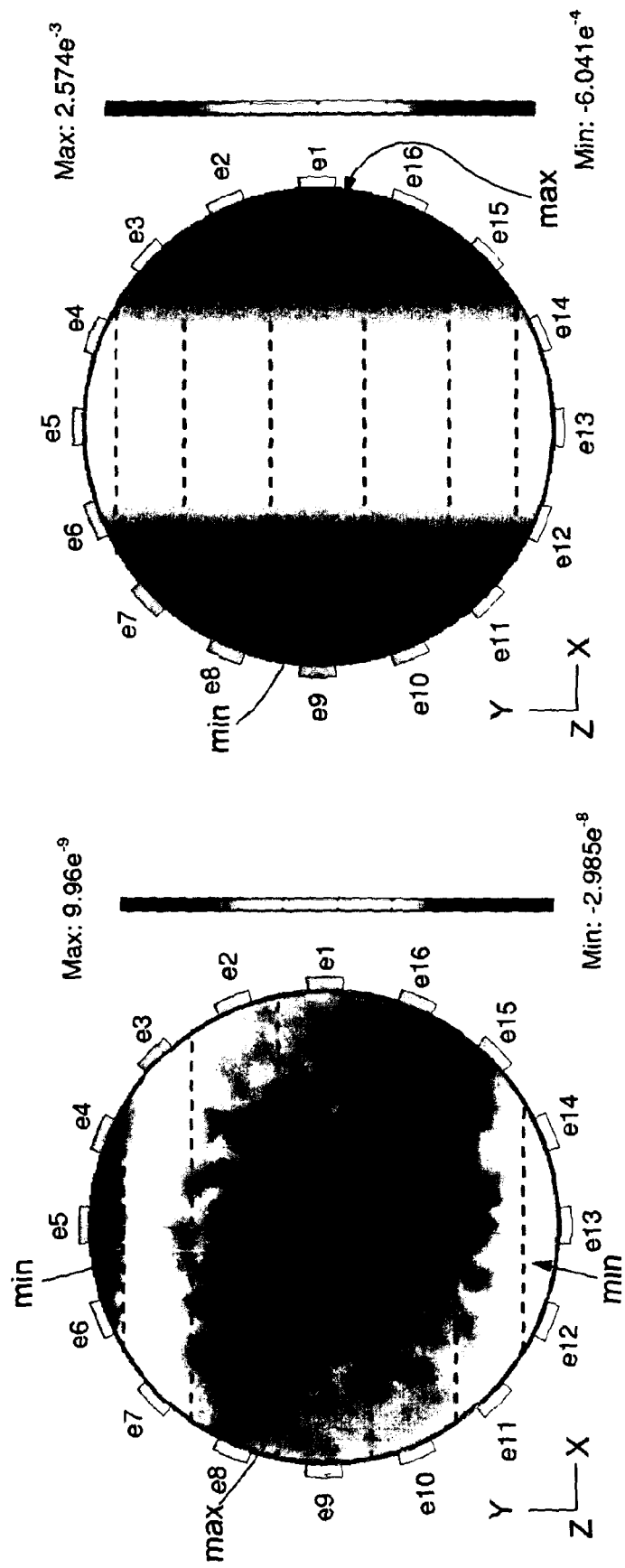

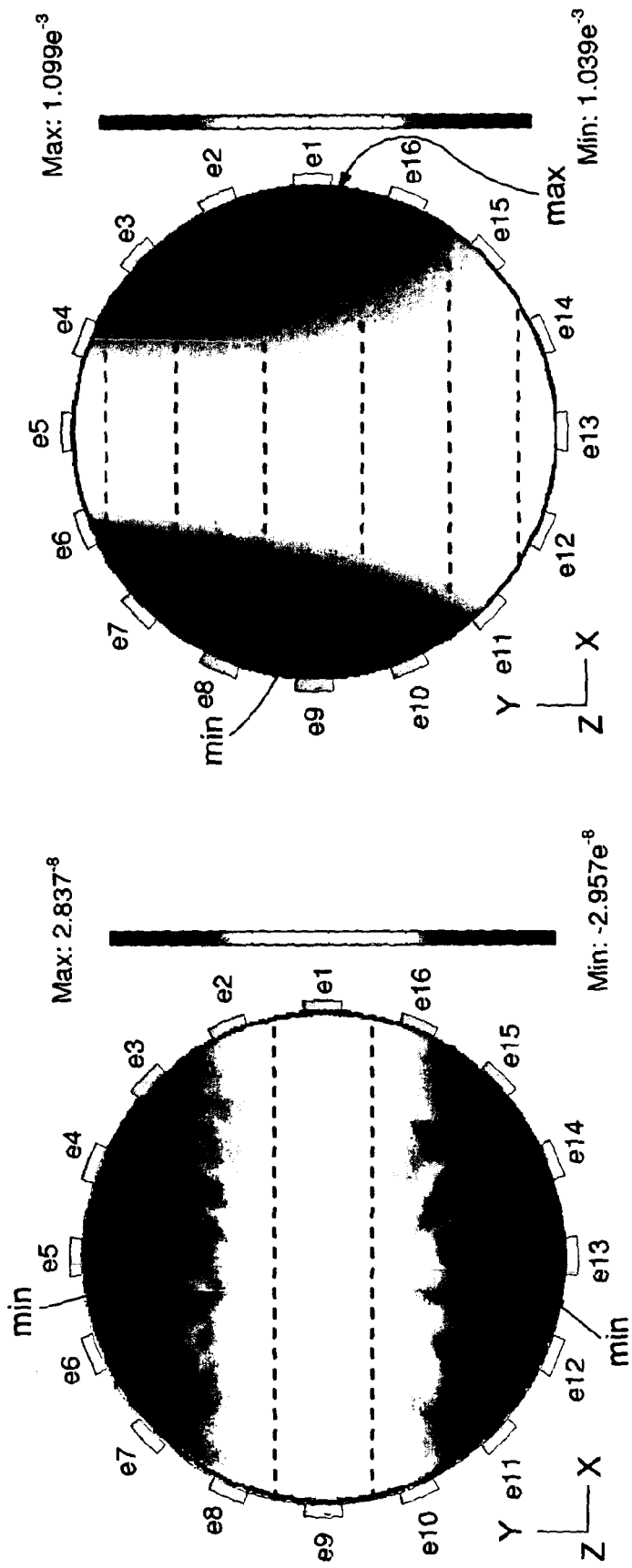

Uniform velocity profile

Non-uniform velocity profile

ELECTROMAGNETIC FLOW METER AND METHOD FOR MONITORING FLUID FLOW OF A CONDUCTING FLUID HAVING EITHER A UNIFORM OR A NON-UNIFORM FLOW PROFILE

CROSS-REFERENCE TO RELATED APPLICATIONS

This patent application is a national stage filing under 35 U.S.C. 371 of International Application No. PCT/GB2011/000600, filed on Apr. 18, 2011, which claims priority to United Kingdom Patent Application No. 1006409.5, filed on Apr. 17, 2010. These applications are incorporated herein by reference in their entireties.

FIELD OF INVENTION

The invention relates to a means and method for monitoring the flow of a fluid. The invention particularly relates to a means and method that is suitable for monitoring the flow of a fluid having a non-uniform flow profile.

BACKGROUND TO THE INVENTION

Electromagnetic flow meters are used in a variety of industries to monitor the flow of conducting fluids. Electromagnetic flow meters utilise Faraday's law of electromagnetic induction to induce a voltage in the conducting fluid as it moves through a magnetic field. The flow rate of the conducting fluid is then derived from the measured induced voltage.

In a conventional electromagnetic flow meter the conducting fluid is directed to flow through a flow pipe, electromagnetic coils are located outside the flow pipe to create a magnetic field, two electrodes are mounted in the flow pipe wall to detect the induced voltage and processing means are configured to process the induced voltage data to determine the average flow rate. Although conventional electromagnetic flow meters are widely used it is recognised that they have a number of limitations. For example, conventional electromagnetic flow meters can only measure the average flow rate of a conducting fluid—they can not determine the axial velocity profile of a conducting fluid. Moreover, conventional electromagnetic flow meters are generally only effective when the conducting fluid has a uniform flow profile—they are unsuitable and/or inaccurate when the conducting fluid has a non-uniform flow profile.

Unfortunately, non-uniform flow conditions are often encountered. For example, a fluid may develop a non-uniform flow profile downstream of a pipe bend, at a partially open valve, in a blocked pipe and/or along an inclined pipe. A multiphase fluid may have a non-uniform flow profile if the component parts have different flow characteristics. The flow of a fluid is non-uniform when, for example, the fluid has a non-axisymmetric velocity profile.

One approach to accurate flow rate measurement of non-uniform single phase fluids has been proposed by HORNER in HORNER, B. (1998) A novel profile-insensitive multi-electrode induction flow meter suitable for industrial use. Meas. Sic. Technol., 24, 131-137. However, this type of flow meter does not provide information on the axial velocity profile of the fluid. This can be a major drawback, particularly in multiphase fluids where, for example, the volumetric flow rate of a particular phase can only be found by integrating the product of the local phase velocity and the local phase volume fraction in the flow cross section. As a result, the approach proposed by Horner can not be used to determine the flow rate of the conducting continuous phase of a multiphase fluid with a non-uniform flow profile.

Other known types of flow meters that are suitable for measuring the flow rate of a conducting phase of a multiphase fluid are constrained by high cost and the use of hazardous radioactive sources to monitor the flow.

SUMMARY OF THE INVENTION

The invention seeks to overcome or address the problems associated with the prior art as described above.

The invention seeks to provide an electromagnetic flow meter and method that is suitable for monitoring the flow of any suitable conducting fluid. The flow meter and method may be suitable for monitoring the flow of a conducting single phase fluid. The flow meter and method may be suitable for monitoring the flow of a conducting continuous phase of a multiphase fluid. The flow meter and method may also be suitable for monitoring the flow of the one or more dispersed phases of the multiphase fluid. For example, the flow meter and method may be suitable for monitoring the flow of extracted oil or gas mixtures, slurries, blood, nuclear waste or water. Moreover, the flow meter and method may be suitable for monitoring the flow of fluid in a number of different environments and technological applications such as in the oil, gas, medical, nuclear, chemical, food processing and mining industries.

The invention seeks to provide an electromagnetic flow meter and method that is suitable for monitoring the flow of a fluid with uniform or a non-uniform flow profile. For example, the flow meter and method may be suitable for monitoring the flow of a conducting single phase fluid with a non-uniform flow profile. The flow meter and method may be suitable for monitoring the flow of a conducting continuous phase of a multiphase flow with a non-uniform flow profile.

The invention seeks to provide an electromagnetic flow meter and method that are suitable for monitoring one or more flow characteristics of a conducting fluid. For example, the flow meter and method may be suitable for measuring the axial velocity profile of a conducting fluid (variation in axial velocity across the flow cross-section). Having derived the axial velocity profile, the flow meter and method may be suitable for determining the volumetric flow rate of the conducting fluid. The flow meter and method may also be suitable for measuring the axial velocity profile and subsequently the volumetric flow rates of each phase of a multiphase fluid. The flow meter and method may be suitable for measuring the velocity profile, and optionally the volumetric flow rate, in real time.

The invention seeks to provide an electromagnetic flow meter and method that is able to monitor the flow of a conducting fluid with a uniform or non-uniform flow profile more accurately than conventional measuring systems. For example, it has been found that the flow meter and method according to the present invention can measure the volumetric flow rate of a non-uniform conducting fluid with an error margin of approximately +/−0.5% in comparison to the error margin of approximately +/−3.5% of conventional flow meters.

The invention seeks to provide an electromagnetic flow meter and method for non-intrusively monitoring the flow of a conducting fluid.

The invention seeks to provide a low-cost electromagnetic flow meter and method for monitoring flow that is cheaper to manufacture and operate than conventional flow meters.

The invention seeks to provide an electromagnetic flow meter and method that does not require the use of a hazardous material for monitoring the flow of a fluid.

According to a first aspect of the present invention there is provided An electromagnetic flow meter for monitoring the flow of a conducting fluid comprising: a flow tube; a means for generating a magnetic field across the flow tube cross-section so that a voltage is induced in the conducting fluid as it flows through the flow tube; an array of voltage detection electrodes configured to divide the flow cross-section into multiple pixel regions and measure the induced voltage in each pixel region; and processing means for determining the axial velocity profile of the conducting fluid by calculating the local axial velocity of the conducting fluid in each pixel region.

In one embodiment the flow tube comprises a non-electrically conducting body. The flow tube may alternatively comprise: an outer body portion formed from a low magnetic permeability material; and an inner body portion formed from a non-electrically conducting material. In either case the flow tube may further comprise an annular liner having a conductivity that is generally the same as the conductivity of the conducting fluid.

Preferably the means for generating a magnetic field comprises a Helmholtz coil having a pair of coils arranged symmetrically on opposing sides of the flow tube. The means for generating a magnetic field may be configured to generate a substantially uniform magnetic field across the flow tube cross-section or may be configured to generate a non-uniform magnetic field across the flow tube cross-section.

In preferred embodiments of the invention the means for generating a magnetic field is configured to generate a magnetic field having a single magnetic field projection (P=1). The means for generating a magnetic field may further be configured to successively generate multiple magnetic fields, each magnetic field having a different magnetic field projections (P>1). Preferably the array of electrodes comprises E electrodes that are configured to divide the flow cross-section up to M pixel regions and measure up to M induced voltages in the conducting fluid when a single magnetic field projection is applied, whereby M=E−1. In particular the array of E electrodes may be configured to divide the flow cross-section into N pixel regions and measure up to N induced voltages in the conducting fluid when multiple magnetic field projections are applied, whereby N=PM.

In preferred embodiments of the invention the processing means is configured to calculate the local axial velocity of the conducting fluid in each said pixel region using the measured induced voltage for each said pixel region and predetermined weight functions for each said pixel region. Additionally the processing means may be configured to calculate the volumetric flow rate of the conducting fluid. Preferably, when the conducting fluid is a conducting single phase fluid, the processing means is configured to calculate the volumetric flow rate using the local axial velocity of the conducting fluid in each pixel region. When the conducting fluid is a conducting continuous phase of a multiphase fluid, the processing means is preferably configured to calculate the volumetric flow rate using the local axial velocity in each pixel region and local concentration distribution of the conducting fluid.

The flow meter may further comprise means for measuring the local concentration distribution of the conducting continuous phase of the multiphase fluid and optionally the local concentration distribution of the one or more dispersed phases of the multiphase fluid. The means for measuring the local concentration distribution may be configured to use an electrical resistance tomography technique or an impedance cross correlation technique. The flow meter may further comprise means for determining the mean density of the multiphase fluid and means for determining the density of each phase of a multiphase fluid. The flow meter may be configured to determine the axial velocity profile, and optionally the volumetric flow rate, of each phase of a multiphase fluid.

Preferably the processing means comprises means for controlling the operation of the means for generating the magnetic field. For example the means for controlling the operation of the means for generating the magnetic field may comprise a coil excitation circuit for controlling the flow of current to the Helmholtz coil.

Preferably the processing means comprises a temperature compensating circuit to compensate for the change in the resistance of the Helmholtz coil as the temperature varies.

Preferably the processing means comprises means for collating the induced voltages.

Preferably the processing means comprises a control circuit to compensate for the effects of any unwanted voltage components.

According to another aspect of the invention there is provided a method for monitoring the flow of a conducting fluid comprising: generating an induced voltage in the conducting fluid; measuring the induced voltage in multiple pixel regions across the flow cross-section; determining the axial velocity profile of the conducting fluid by calculating the local axial velocity of the conducting fluid in each pixel region.

Preferably calculating the local axial velocity of the conducting fluid in each pixel region comprises using the measured induced voltages and predetermined weight functions. The method may further comprise determining the weight functions for each pixel in the flow cross-section prior to monitoring the flow of the conducting fluid.

Preferably the method further comprises applying a magnetic field with a single magnetic field projection across the conducting fluid so as to induce a voltage in the conducting fluid, whereby the magnetic field is a uniform magnetic field or a non-uniform magnetic field. The method may also comprise successively applying multiple magnetic fields across the conducting fluid, whereby each magnetic field has a different magnetic field projection.

In preferred embodiments of the invention the method may comprise determining the volumetric flow rate of the conducting fluid.

The conducting fluid may be a conducting single phase fluid and the method may comprise determining the volumetric flow rate of the conducting fluid comprises using the axial velocity profile of the conducting fluid. The conducting fluid may alternatively be a conducting continuous phase of a multiphase fluid, and the method may comprise determining the volumetric flow rate of the conducting fluid comprises using the axial velocity profile and local concentration distribution of the conducting fluid. The method may further comprise measuring the local concentration distribution of the conducting fluid and optionally measuring the local concentration distribution of one or more dispersed phases.

Preferably measuring the local concentration distribution of the conducting fluid comprises using an electrical resistance tomography technique or an impedance cross correlation technique.

Preferably the method further comprises determining the axial velocity profile, and optionally the volumetric flow rate, of each phase of the multiphase fluid. The method may also further comprise controlling the magnetic field. For example the magnetic field may be generated by a Helmholtz coil, and the controlling of the magnetic field may comprise controlling the flow of current to the Helmholtz coil.

Preferably the method may further comprise compensating for a variation in the magnetic field due to temperature fluctuations.

The method may further comprise collating the induced voltages.

The method may further comprise compensating for the effects of any unwanted voltage components.

Viewed from another broad aspect the present invention provides a means for determining the local concentration distribution of a conducting continuous phase of a multiphase fluid using an impedance cross correlation technique comprising: a flow tube through which the multiphase fluid may flow; a first array of electrodes arranged uniformly around the circumference of the flow tube; a second array of electrodes arranged uniformly around the circumference of the flow tube and axially separated from the first array by a predetermined distance; means for applying a sequence of electrical potentials to the electrodes of the second array so as to generate an electrode potential rotational pattern; means for measuring the resistance of the multiphase fluid in a predetermined region of the flow cross section; means for determining the conductivity of the multiphase fluid using the resistance of the multiphase fluid; and means for determining the local concentration distribution of the conducting continuous phase using the conductivity of the multiphase fluid.

Viewed from a further broad aspect the present invention provides a means for determining the mean density of a multiphase fluid comprising: a flow tube through which the multiphase fluid may flow; means for determining a differential pressure in the multiphase fluid by measuring the pressure of the multiphase fluid at different points along the length of the flow tube; means for determining the mean fluid density of the multiphase fluid using the measured differential pressure.

BRIEF DESCRIPTION OF THE DRAWINGS

For a better understanding of the invention, and to show how the same may be carried into effect, reference will now be made, by way of example, to various specific embodiments of the different aspects of the invention as shown in the accompanying diagrammatic drawings, in which:

FIG. 2b depicts a schematic cross-sectional view of the flow meter of FIG. 2a;

FIG. 2c depicts a schematic top view of the flow meter of FIG. 2a;

FIG. 2d depicts a schematic view of the electrode configuration and pixels of the flow cross-section of the flow meter of FIG. 2a;

FIG. 2e is a table showing how the pixels relate to the pairs of electrodes and potential different measurements for the flow meter of FIG. 2a;

FIG. 4 depicts a housing enclosing at least part of the flow meter of FIG. 2a;

FIG. 8b depicts a 2-dimensional schematic diagram of the flow meter of FIG. 8a;

FIG. 9 depicts a schematic view of the flow pixels in the flow meter of FIG. 8a;

FIG. 10 depicts a table that lists the geometries of the flow meter of FIG. 8a;

FIG. 12b depicts the weight values calculated from the induced voltages of FIG. 12a;

FIG. 13a depicts a distribution of the Lorentz force per unit volume on a conducting fluid with a uniform flow profile;

FIG. 13b depicts the electrical potential on the z-plane of the conducting fluid of FIG. 13a;

FIG. 14a depicts a distribution of the Lorentz force per unit volume on a conducting fluid with a non-uniform flow profile;

FIG. 14b depicts the electrical potential on the z-plane of the conducting fluid of FIG. 14a;

DETAILED DESCRIPTION OF THE INVENTION

Figure 1:
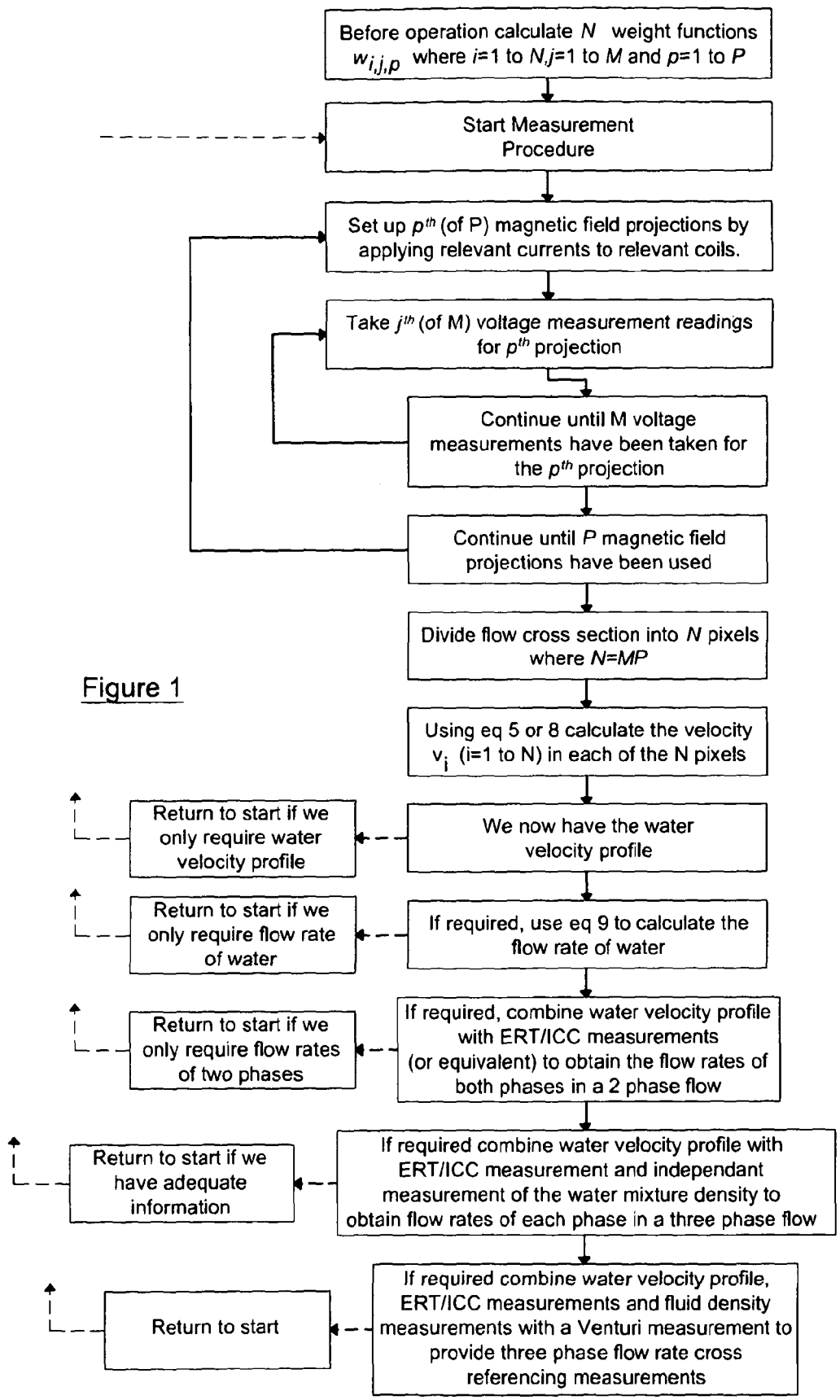
FIG. 1 depicts a flow chart showing the operational steps of an embodiment of an electromagnetic flow mete according to the invention.

1. Determining the Axial Velocity Profile of a Conducting Fluid

The invention relates to an electromagnetic flow meter and method for monitoring the flow of a conducting fluid. As part of the monitoring process, the flow meter and method determine the axial velocity profile of a conducting fluid. The conducting fluid may be a conducting single phase fluid or a conducting continuous phase of a multiphase fluid. The conducting fluid may have a uniform flow profile or a non-uniform flow profile.

In its simplest form, the flow meter comprises a flow tube, a means for generating a magnetic field across the flow tube cross-section, an array of voltage detection electrodes circumferentially arranged around the flow tube and processing means for determining the axial velocity profile of a conducting fluid.

The flow tube is a pipe along which fluid can flow when the flow meter is in use. As mentioned above, the fluid may be a conducting single phase fluid or a multiphase fluid comprising a conducting continuous phase and at least one dispersed phase.

The means for generating a magnetic field is configured to generate a magnetic field across the flow tube cross-section so that a voltage is induced in the conducting fluid as it flows through the flow tube. The means for generating a magnetic field may successively generate multiple magnetic fields, each magnetic field having a different magnetic flux density distribution. Each magnetic flux density distribution may be referred to as a magnetic field projection. In any given application, the number of projections generated is P, whereby P≥1.

The flow meter comprises an array of E electrodes. The electrodes are circumferentially mounted on an internal surface of the flow tube so as to detect the induced voltage between various points on the circumference of the flow tube. The electrodes are configured so as to divide the flow cross-section into pixels (discrete regions) and to measure the local induced voltage in each pixel.

The array of electrodes can divide the flow cross-section into a maximum of M pixels at any one time, where M=E−1. Hence, up to M independent induced voltage measurements can be made between E electrodes when a magnetic field is applied. Consequently, the total number of independent induced voltage measurements that can be made is N, where N=PM. In other words, the electrodes are able to measure the induced voltage of the conducting fluid in N pixels (discrete regions) in the flow cross-section.

As will be explained in detail below, the processing means is configured to determine the axial velocity profile of the conducting fluid using the measured induced voltages and predetermined weight functions.

In an electromagnetic flow meter, the charged particles of the conducting fluid experience a Lorentz force as they move in the magnetic field. The Lorentz force acts in a direction perpendicular to both the conducting fluid's motion and the applied magnetic field. The local current density j in the conducting fluid is governed by Ohm's law in the form of $$j = \sigma(E + v \times B) \quad (1)$$

where $\sigma$ is the local fluid conductivity, E is the local electric field in the stationary coordinate system, v is the local fluid velocity, and B is the local magnetic flux density. The expression (v×B) represents the Lorentz force induced by the fluid motion, whereas E is principally due to charges distributed in and around the fluid.

For fluids of essentially constant conductivity, the local potential difference U generated in the conducting fluid is defined by the equation:

$$\nabla^2 U = \nabla \cdot (v \times B) \quad (2)$$

where v is the local fluid velocity and B is the local magnetic flux density.

In the present invention, where the flow cross section of the flow meter is divided into N pixels and where N potential difference measurements are made between the electrodes placed around the internal circumference of the flow tube a solution to equation 2 is of the form:

$$U_j = \frac{2\overline{B}}{\pi a} \sum_{i=1}^{N} v_i w_{ij} A_i \quad (3)$$

where $A_i$ represents the cross sectional area of the $i^{th}$ of N pixels into which the flow cross section is divided, $v_i$ is the mean axial flow velocity in the $i^{th}$ pixel, $U_j$ is the $j^{th}$ of N potential difference measurements made at the boundary of the flow, the term w is a so called weight value which relates the flow velocity in the $i^{th}$ pixel to the $j^{th}$ potential difference measurement and a is the internal pipe radius and $\overline{B}$ is the mean magnetic flux density in the flow cross section.

Thus, the local axial velocity of the conducting fluid in each of the N pixels can be determined from predetermined weight values $w_{ij}$ and N potential difference measurements $U_j$ made on the boundary of the flow using the electrodes.

The N independent equations arising from equation 3 can be expressed by the following matrix equation:

$$\overline{B}U = \frac{2}{\pi a} WAV \quad (4)$$

in which V is a single column matrix containing the pixel velocities $v_i$, W is a square matrix containing the relevant weight values $w_{ij}$, A is a square matrix containing information on the pixel areas $A_i$ and U is a single column matrix containing the measured potential differences $U_j$.

Using a standard matrix inversion technique, such as the Tikhonov technique, equation 4 can be solved giving:

$$V = \frac{\pi a}{2\overline{B}} [WA]^{-1} U \quad (5)$$

Thus, when a single magnetic field projection is applied, the flow meter can determine the axial velocity profile of the conducting fluid by dividing the flow cross section into N pixels and using equation 5 to derive the axial flow velocity in each of the N pixels.

It has been found that the accuracy of the flow meter is at least partially determined by its spatial resolution (i.e. the number of pixels, N) and thereby the number of potential difference measurements that can be taken. Since the number of electrodes is restricted by the circumferential size of the flow tube, the accuracy of the flow may thereby be improved by increasing the number of magnetic flux density distributions P.

For example, a flow meter may comprise 8 electrodes that are configured to measure the potential difference in 7 discrete locations on the boundary of the flow cross section. If a single magnetic field projection is applied (P=1) the flow cross section is divided into only 7 pixels because a total of only 7 independent potential difference measurements can be measured by the flow meter. However, if two different magnetic flux density distributions are applied (P=2), the flow cross section is divided into 14 pixels because a total of 14 independent potential difference measurements can be measured by the flow meter.

When multiple magnetic flux density distributions are applied, the N independent potential difference measurements can be related to the unknown axial flow velocity $v_i$ in each of N discrete regions, or pixels, in the flow cross section by N independent equations of the form $$\frac{U_{j,p}}{\overline{B}_P} = \frac{2}{\pi a} \sum_{i=1}^{N} w_{i,j,p} A_i v_i \quad (6)$$

where $U_{j,p}$ is the $j^{th}$ (of M) independent potential difference made using the $p^{th}$ (of P) projections, $A_i$ is the area of the $i^{th}$ (of N) pixels, $w_{i,j,p}$ is a weight value relating the flow velocity in the $i^{th}$ pixel to the $j^{th}$ potential difference measurement using the $p^{th}$ magnetic field projection, $\overline{B}_P$ is the mean flux density in the flow cross section associated with the $p^{th}$ projection and a is the internal radius of the flow tube.

The N independent equations arising from equation 6 above can be written in matrix form as $$R_B U = \frac{2}{\pi a} W A V \quad (7)$$

where U is an (N×1) matrix containing the measured potential differences, W is an (N×N) matrix containing the known weight values, A is an (N×N) matrix containing information on the known pixel cross sectional areas, $R_B$ is an (N×N) matrix containing information on the reciprocals of the known mean flux densities in the flow cross section (associated with each of the P magnetic field projections) and V is an (N×1) matrix containing the unknown axial flow velocities in the N pixels.

By using standard matrix inversion techniques, such as the Tikhonov technique, equation 7 can be solved giving $$V = \frac{\pi a}{2}[WA]^{-1}[R_B U] \quad (8)$$

Thus, when multiple magnetic field projections are applied, the flow meter can determine the axial velocity profile of the conducting fluid by dividing the flow cross section into N pixels and using equation 7 to derive the axial flow velocity in each of the N pixels.

The matrices used in equations 3 to 8 are defined below:

(i) U is a (N×1) matrix where the term $U_{j,p}$ represents the $j^{th}$ potential difference measurement associated with the $p^{th}$ magnetic field projection; (j=1 to M and p=1 to P).

$$U = \begin{bmatrix} U_{1,1} \\ U_{2,1} \\ . \\ U_{M,P} \end{bmatrix} \quad (A1)$$

(ii) $R_B$ is an (N×N) diagonal matrix where $\overline{B}_p$ is the mean magnetic flux density in the flow cross section associated with the $p^{th}$ magnetic field projection; (p=1 to P).

$$R_B = \begin{bmatrix} 1/\overline{B}_1 & 0 & \cdot & 0 & 0 \\ 0 & 1/\overline{B}_1 & \cdot & 0 & 0 \\ \cdot & \cdot & \cdot & \cdot & \cdot \\ 0 & 0 & \cdot & 1/\overline{B}_P & 0 \\ 0 & 0 & \cdot & 0 & 1/\overline{B}_P \end{bmatrix} \quad (A2)$$

(iii) W is an (N×N) matrix where $w_{i,j,p}$ is the weight value relating the axial flow velocity in the $i^{th}$ pixel to the $j^{th}$ potential difference measurement associated with the $p^{th}$ magnetic field projection (i=1 to N, j=1 to M and p=1 to P).

$$W = \begin{bmatrix} w_{1,1,1} & w_{2,1,1} & \cdot & w_{N,1,1} \\ w_{1,2,1} & w_{2,2,1} & \cdot & w_{N,2,1} \\ \cdot & \cdot & \cdot & \cdot \\ w_{1,M,P} & w_{2,M,P} & \cdot & w_{N,M,P} \end{bmatrix} \quad (A3)$$

(iv) A is a (N×N) diagonal matrix where $A_i$ is the cross sectional area of $i^{th}$ pixel; (i=1 to N).

$$A = \begin{bmatrix} A_1 & 0 & \cdot & 0 \\ 0 & A_2 & \cdot & 0 \\ \cdot & \cdot & \cdot & \cdot \\ 0 & 0 & \cdot & A_N \end{bmatrix} \quad (A4)$$

(v) V is a (N×1) matrix where $v_i$ is the axial flow velocity in the $i^{th}$ pixel; (i=1 to N).

$$V = \begin{bmatrix} v_1 \\ v_2 \\ . \\ v_N \end{bmatrix} \quad (A5)$$

It will be understood that when determining the axial velocity profile of a conducting single phase fluid, the flow meter calculates the mean velocity of the conducting fluid in each pixel. When determining the axial velocity profile of the conducting continuous phase of a multiphase fluid, the flow meter calculates the simple mean velocity of the conducting continuous phase which is calculated in each pixel. By simple mean it is implied that the calculated velocity is not weighted by the concentration, or local volume fraction, of the conducting continuous phase in the pixel.

As explained above, the axial velocity of the conducting fluid in each of the N pixels is determined using predetermined weight values $w_{ij}$, $w_{i,j,p}$. The weight values represent the relative contribution of the fluid flow at a particular spatial location in the flow cross section to the measured potential difference. Thus, when determining the axial velocity in N pixels, $N^2$ weight values are required. These weight values are calculated, from solutions of Maxwell's equations of electromagnetism. These $N^2$ weight values are dependent upon the geometry of the electromagnetic flow meter, its materials of construction and also upon the magnetic field projections that are employed. The weight values need only be calculated once, prior to using the flow meter device. An example of how weight values can be calculated is described below.

It has been found that the axial flow velocity of each pixel as determined by the present invention are in agreement with the reference pixel velocities determined by other measuring means. Thus, the axial flow velocities enable reasonably accurate volumetric flow estimates to be made, even in the presence of highly non-uniform velocity profiles.

2. Determining Volumetric Flow Rate of a Conducting Fluid

Once the axial velocity profile of the conducting fluid is determined, the flow meter and method may determine the volumetric flow rate of the conducting fluid.

For example when monitoring a conducting single phase fluid, the volumetric flow rate $Q_c$ of the conducting single phase fluid can be calculated from the determined axial velocity profile as follows;

$$Q_c = \sum_{i=1}^{N} A_i v_i \quad (9)$$

in which $Q_c$ is the volumetric flow rate, $A_i$ is the area of the $i^{th}$(of N) pixel, and $v_i$ is the axial velocity in the $i^{th}$ pixel.

When monitoring a conducting continuous phase of a multiphase phase fluid, the volumetric flow rate of the conducting continuous phase $Q_c$ can be determined providing the local concentration distribution (also known as the local volume fraction distribution) of the conducting continuous phase $\alpha_c$ in the flow cross section is known.

For example, in a two phase fluid the volumetric flow rate of the conducting continuous phase $Q_c$ can be calculated using the following equation:

$$Q_c = \int_A v_c \alpha_c dA \qquad (10)$$

where $v_c$ is the local axial velocity in the flow cross section, $\alpha_c$ is the local volume fraction distribution of the conducting continuous phase and A is the flow tube cross sectional area.

In a three phase fluid, the volumetric flow rate of the conducting continuous phase $Q_c$ can be calculated using the following equation:

$$Q_c = \sum_{i=1}^{N} (\alpha_c^i)(v_c^i)A_i \qquad (11)$$

where $V^i_c$ is the velocity of the conducting continuous phase in the $i^{th}$ pixel into which the flow cross section is divided, $\alpha^i_c$ is the local volume fraction distribution of the conducting continuous phase in the ith pixel, and A i is the area of the ith pixel.

The flow meter preferably comprises means for measuring the local volume fraction distribution of the conducting continuous phase. The flow meter may comprise means for measuring the local volume fraction distribution using the well known technique of Electrical Resistance Tomography (ERT). Alternatively, the flow meter may comprise means for measuring the local volume faction distribution using an impedance cross correlation technique (ICC). An example of a flow meter comprising means for measuring the local volume fraction distribution using an impedance cross correlation technique is described below.

3. Monitoring the Flow Each Phase of a Multiphase Fluid

In addition to monitoring the flow of a conducting continuous phase of a multiphase fluid, the flow meter and method may also monitor the flow of the one or more dispersed phases of the multiphase fluid. For example, the flow meter and method may determine the local velocity of a dispersed phase in the flow cross section $v_d$ and optionally the volumetric flow rate of a dispersed phase $Q_d$.

The flow meter may comprise means for measuring the local velocity of the dispersed phase using an impedance cross correlation technique (ICC). An example of flow meter comprising means for measuring the local velocity of the dispersed phase using an impedance cross correlation technique is described below.

The volumetric flow rate of a dispersed phase can be determined providing the local concentration distribution (also known as the local volume fraction distribution) of the dispersed phase $\alpha_d$ in the flow cross section is also known. (The flow meter may comprise means for measuring the local volume fraction distribution of the dispersed phase $\alpha_d$ using an impedance cross correlation technique).

For example, in a two phase fluid the volumetric flow rate of the dispersed phase $Q_d$ can be calculated using the following equation:

$$Q_d = \int_A v_d \alpha_d dA \qquad (12)$$

where $v_d$ is the local axial velocity in the flow cross section, $\alpha_d$ is the local volume fraction distribution of the dispersed phase and A is the flow tube cross sectional area.

In a three phase fluid, the volumetric flow rate of a particular dispersed phase $Q_d$ can be calculated using the following equation:

$$Q_d = \lambda_d \bar{v}_d A \qquad (13)$$

where $\lambda_d$ is the means volume fraction of the dispersed phase in the flow cross section as measured using an impedance cross correlation technique, $\bar{v}_d$ is the mean velocity of the dispersed phase and A is the flow tube cross sectional area.

The flow meter may also comprise density measuring means for determining the mean density of a multiphase fluid.

Examples of flow meters configured to determine the local velocity of a dispersed phase in the flow cross section $v_d$ the volumetric flow rate of a dispersed phase $Q_d$ and the means density of a multiphase fluid are described below.

Monitoring of Conducting Fluid in a Partially Filled or Partially Blocked Pipe

The flow meter and method can be used to make flow rate measurements of a conducting fluid in partially filled or partially blocked pipes, provided that a minimum of two electrodes are immersed in that part of the cross section of the pipe where flow still occurs.

Flow Diagram Depicting the Operation of a Flow Meter and Method

FIG. 1 depicts a flow diagram that shows the operational steps of an example of a flow meter and method according to the present invention. In this particular example, the conducting fluid is water:

Step 1—Prior to starting the measuring procedure, the flow meter calculates the weight functions for each pixel.

Step 2—On starting the measuring procedure, the flow meter generates a pth (of P) magnetic field projections so as to induce a voltage in the conducting fluid.

Step 3 and 4—the flow meter takes M potential difference measurements at different points around the circumference of the flow tube.

Step 5—if multiple magnetic field projections are to be used, the flow meter repeats steps 2 to 4 until P magnetic field projections have been applied.

Step 6—the flow meter determine the total number of pixels/potential difference measurements.

Step 7—the flow meter calculates the axial velocity of the conducting fluid in each of the pixels using equation 5 if P=1 or equation 8 if P>1 and optionally the flow meter stops/returns to the start if only the axial velocity profile of a conducting fluid is required.

Optional Step 8—when monitoring a conducting single phase fluid, the flow meter may calculate the volumetric flow rate of the conducting fluid using equation 9.

Optional Step 9—when monitoring a two phase fluid, the flow meter may combine the axial velocity profile of a conducting continuous phase with local volume fraction measurements of the conducting continuous phase and dispersed phase and also the local axial velocity of the dispersed phase (measured using an ERT or ICC technique) to determine the volumetric flow rate of both the conducting continuous phase and dispersed phase in a two phase fluid.

Optional Step 10—when monitoring a three phase fluid, the flow meter may combine the axial velocity profile of the conducting continuous phase with local volume fraction measurements of the conducting continuous phase and dispersed phases, local axial velocity of the dispersed phases (measured using an ERT or ICC technique) and density measurements to determine flow characteristics of each phase of the three phase fluid.

Optional Step 11—when monitoring a three phase fluid, the flow meter may combine the results determined in step 10 with venturi measurements to cross-reference the determined flow characteristics of each phase of the three phase fluid.

4. The Flow Meter

As mentioned above, the flow meter according to the present invention comprises a means for generating a magnetic field across the flow tube cross-section, an array of voltage detection electrodes circumferentially arranged around the flow tube and processing means for determining the flow characteristics of the conducting fluid.

4a The Flow Tube

The flow tube is a pipe along which fluid may flow when the flow meter is in use. The fluid may be a conducting single phase fluid or a multiphase fluid comprising a conducting continuous phase and at least one dispersed phase.

The flow tube preferably comprises a body formed from a non-electrically conducting material, such as PTFE. Alternatively, the flow tube may comprise an outer body portion formed from a low magnetic permeability material and an inner body portion (e.g. a liner) formed from a non-electrically conducting material, thereby ensuring the electrodes are electrically isolated from each other. In yet another embodiment, the flow tube may comprise an inner body portion (e.g. an annular liner) that is formed from a material having a conductivity that is at least similar to that of the conducting phase flow and deployed between the electrodes and the flow in order to improve the uniformity of weight function values.

The flow tube may have any suitable diameter and length. The diameter and length of the flow tube may be selected according to the type of fluid, volume of fluid and/or location of the flow tube.

When the flow meter is in use, an electrically conducting single phase fluid may flow through the flow tube, such as water. Alternatively, a multiphase fluid having an electrically conducting continuous phase and one or more dispersed phases may flow along the flow tube. Examples of a multiphase fluid include solids-in-water flows such as sludges and slurries, oil-in-water flows, gas-in-water flows, and oils and gas-in-water flows.

FIGS. 2a-2d depict an embodiment of a flow meter according to the first aspect of the invention whereby the flow tube (1) is a PTFE pipe with an internal diameter of approximately 80 mm, an external diameter of approximately 110 mm and a length of approximately 410 mm.

4b. The Flange

The flow meter may comprise a flange arranged at one or both ends of the flow tube. The flange may be configured so as to allow the flow meter to be coupled to a further apparatus, such as a pipe. The flange may comprise one or more apertures to receive securing means (e.g. bolts, screws, clips etc) suitable for securing the flow meter to a further apparatus.

In FIGS. 2a-2d, the electromagnetic flow meter comprises a first flange (2a) arranged at a first end of the flow tube and a second flange (2b) arranged at a second end of the flow tube. The flanges have a diameter of approximately 203 mm and a thickness of approximately 24 mm. The flanges are configured so that the flow meter can be connected to external pipe work. Each flange comprises a plurality of bolt holes (2c) with an internal diameter of approximately 16 mm.

4c. Means for Generating a Magnetic Field

The means for generating a magnetic field in the flow meter is configured to generate a magnetic field so that a voltage is induced across the conducting fluid as it flows through the flow tube. As shown in FIGS. 2a-2d, the means for generating a magnetic field generate a magnetic field that is orthogonal to both the direction of the flowing fluid and plane of the array of electrodes so that the potential difference at the boundary of the flow tube can be detected by the electrodes.

The means for generating a magnetic field may generate a generally uniform magnetic field across the flow tube. Alternatively, the means for generating a magnetic field may generate a non-uniform magnetic field across the flow tube. The means for generating a magnetic field may be configured to generate a non-uniform magnetic field across each pixel (discrete region) of the flow tube cross-section. The non-uniform magnetic field may be applied to help distinguish between different axisymmetric or non-axisymmetric velocity profiles.

The means for generating a magnetic field comprises any suitable electromagnetic means for generating a magnetic field. For example, the means for generating a magnetic field may comprise a Helmholtz coil mounted around the periphery of the flow tube. The Helmholtz coil comprises a pair of identical coils (3a, 3b) arranged symmetrically on opposing sides of the flow tube as shown in FIGS. 2a to 2d. The Helmholtz coil may be securely mounted to the flow tube using coil supports/stiffeners (4) and coil mounting brackets (5).

The Helmholtz coil may comprise any suitable size and number of turns. The coils may have a mean diameter that is approximately twice the mean coil separation distance. In the embodiment depicted in FIGS. 2a-2d, the coils of the Helmholtz coil are approximately 30 mm thick, approximately 29 mm wide, have an internal diameter of approximately 202 mm, have an external diameter of approximately 260 mm, comprise approximately 1024 turns of 0.776 mm diameter wire and have an approximately 5 AMP capacity.

As mentioned above, the means for generating a magnetic field may successively generate multiple magnetic fields, each magnetic field having, a different magnetic flux density distribution. Each magnetic flux density distribution may be referred to as a magnetic field projection. In any given application, the number of projections generated is P, whereby $P \geq 1$. Each projection may be consecutively applied for a short time interval.

For each of the P magnetic field projections there is a 'complementary projection' in which the magnitude of the current in each coil remains the same but the direction of the current is reversed. If, immediately after applying a given projection, the 'complementary projection' is applied for an equivalent length of time this enables the direction of the magnetic field to be reversed which, in turn, minimises electrochemical effects at the interface between the electrodes and the flowing fluids. However application of the 'complementary projection' does not enable additional independent potential difference measurements to be made.

The magnetic flux density distribution across the flow tube is dependent on the magnitude and direction of the electrical current in the Helmholtz coil. Thus, different magnetic flux density distributions may be generated by varying the magnitude and/or direction of the electrical currents supplied to the Helmholtz coil. Alternatively or additionally, the different magnetic flux density distributions may be generated by arranging multiple pairs of Helmholtz coils in different planes around the flow tube.

The means for generating a magnetic field preferably generates a magnetic field having a rectangular waveform so as to minimise the effects of electrolysis at the electrodes. For example, the means for generating a magnetic field may generate a rectangular waveform magnetic field alternating between +/−40 Gauss.

In the embodiment depicted in FIGS. 2a-2d, the Helmholtz coil is configured such that current flows through both coils in the same direction and each coil carries an equal amount of electric current. Hence, the Helmholtz coil generates a generally single and uniform magnetic flux density distribution in the flow cross section. The magnitude of the magnetic flux density in the y direction is relatively constant and the mean value $\overline{B}$ of the magnitude of the y component of the magnetic flux density in the flow cross section is 7.996 Gauss (7.996× $10^{-4}$ T).

4d. The Electrode Array

The flow meter comprises an array of E electrodes. The electrodes are circumferentially mounted on an internal surface of the flow tube so as to detect the induced voltage at various points on the internal circumference of the flow tube. The electrodes are arranged as opposing pairs around the circumference of the flow tube so as divide the flow cross-section into pixels (discrete regions) and to measure the local induced voltage in each of the pixels.

The array of E electrodes may be arranged so that up to M independent induced voltage measurements can be made between the electrodes, whereby M=E−1. Thus, the total number of independent induced voltage measurements that can be made is N, where N=PM. In other words, the electrodes are able to measure the induced voltage of the conducting fluid in N pixels (discrete regions) in the flow cross section.

In one embodiment, the electromagnetic flow meter may be configured to take seven independent potential difference measurements (M=7), provided that the number of electrodes E is greater than or equal to 8 (M+1). Thus, if a single magnetic field projection is used (P=1) the flow cross section is thereby divided into a total of 7 pixels (N=7) and a total of 7 independent potential difference measures can be taken over the measuring period. If three magnetic field projections (P=3) are successively applied then the flow cross section is divided into a total of 21 pixels and a total of 21 independent potential difference measurements can be taken over the measuring period.

Figure 2A:
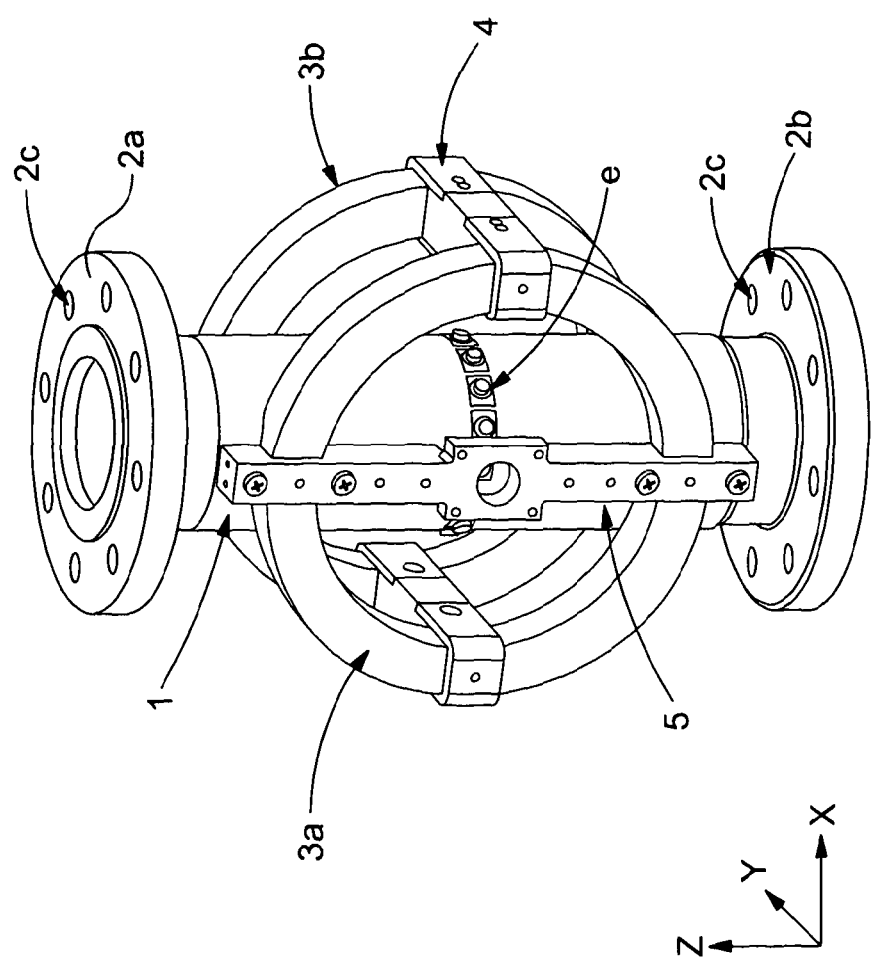
FIG. 2a depicts a perspective view of a further embodiment of an electromagnetic flow meter according to the invention.
Figure 2B:
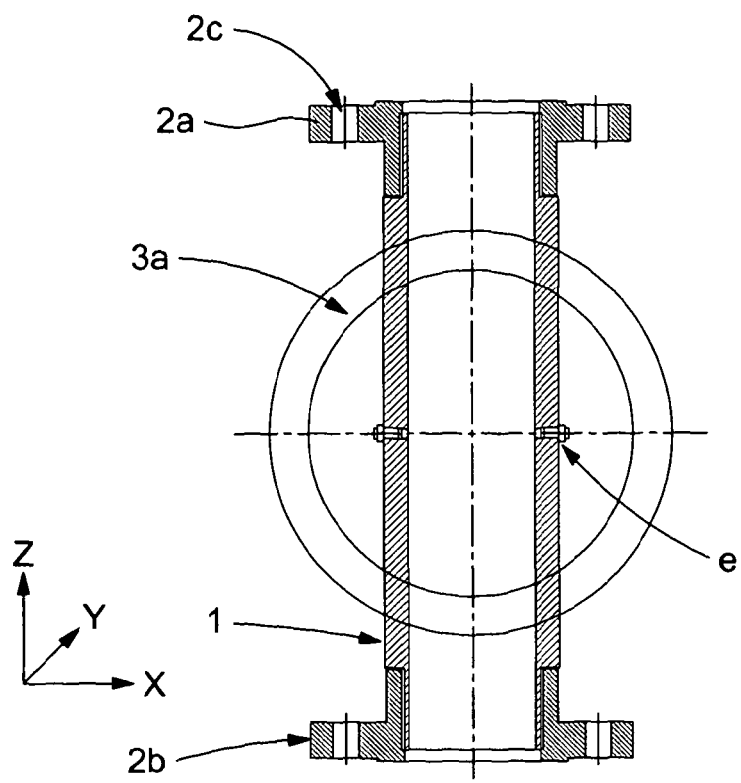
Figure 2C:
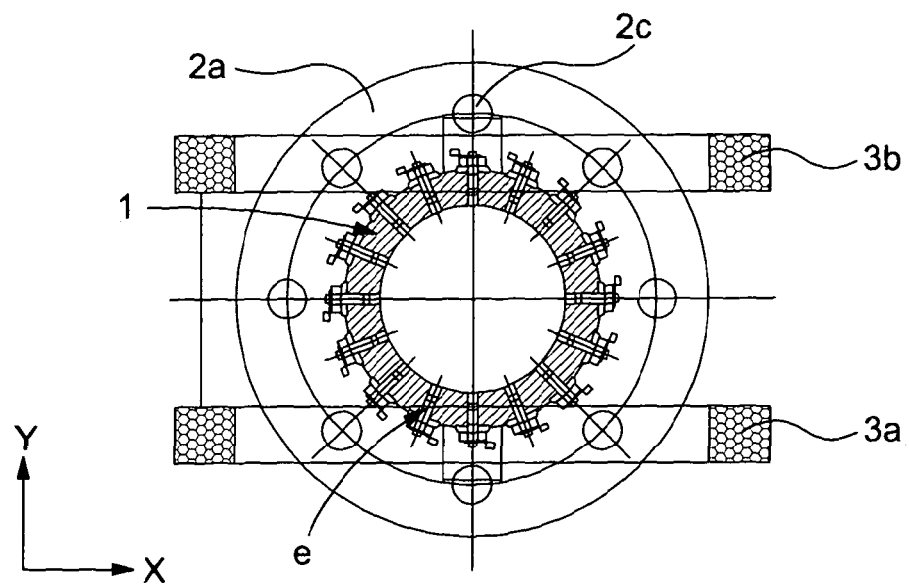
Figures 2D, 2E:
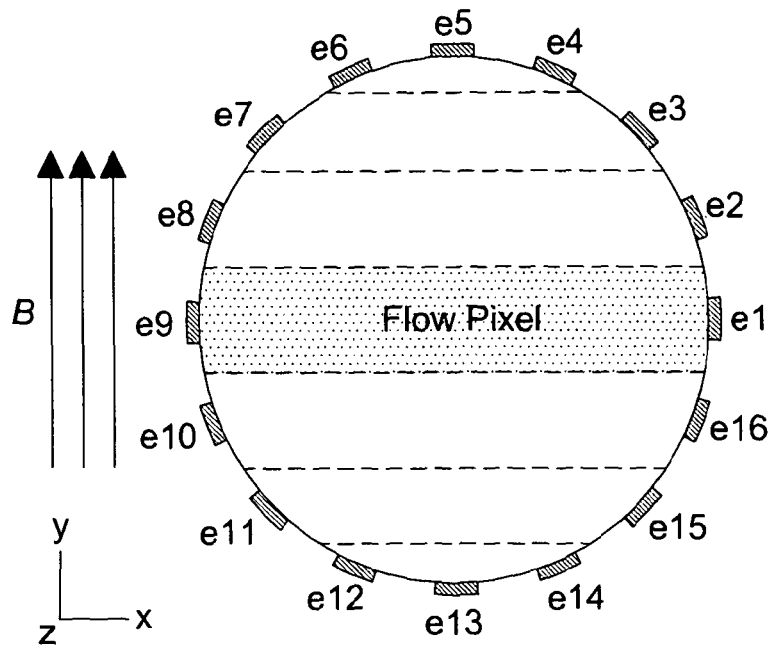

As shown in FIG. 2d, the pixels may be parallel, elongate regions extending between opposing sides of the flow tube. However, it should be noted that the pixels can be of any shape or size provided that, in total, they entirely cover the (normally circular) cross section of the flow tube.

The electromagnetic flow meter may comprise any suitable number of electrodes. In the embodiment depicted in FIGS. 2a-2d, the flow meter comprises 16 electrodes (e) arranged at the internal boundary of the flow pipe (at plane z=0) and in contact with the flowing fluid. The electrodes are placed at angular intervals of 22.5 degrees on the flow pipe boundary. In FIG. 2d, the electrodes are denoted e1, e2, etc, with electrodes e5 at the top of the flow cross section and electrode e13 at the bottom of the flow cross section. For this particular flow meter, the electrodes are configured such that the flow cross-section is divided into seven pixels. The geometry of these seven pixels is chosen such that the chords joining seven pairs of electrodes are located at the geometric centres (in the y direction) of the pixels. The fluid pixels are categorized as pixel 1 at the top of the flow cross section to pixel 7 at the bottom of the flow cross section. Seven potential difference measurements can be made between the seven electrode pairs. Since the jth potential difference measurement $U_j$ is made between the jth electrode pair, the potential difference measurements are notated $U_1$, $U_2$ etc in the table depicted in FIG. 2e. The local magnetic flux density B is perpendicular to both the flow direction and to the chords joining the electrode pairs.

The electrodes may be made from a low magnetic permeability material (e.g. stainless steel or brass) if the flow tube comprises a non-electrically conducting pipe wall. Alternatively, if the flow tube comprises an outer conducting wall and an inner non-conducting liner, the electrodes are configured to be electrically insulated from the outer metal wall. This may be achieved by enclosing each of the electrodes in a non-conducting liner.

Figure 3A:
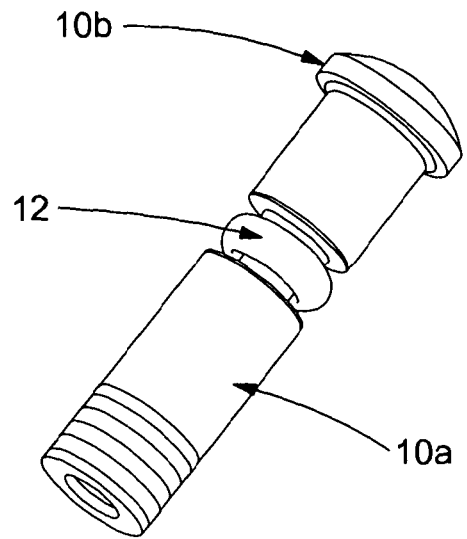
FIG. 3a depicts a perspective view of an embodiment of a voltage detecting electrode according to the invention.
Figure 3B:
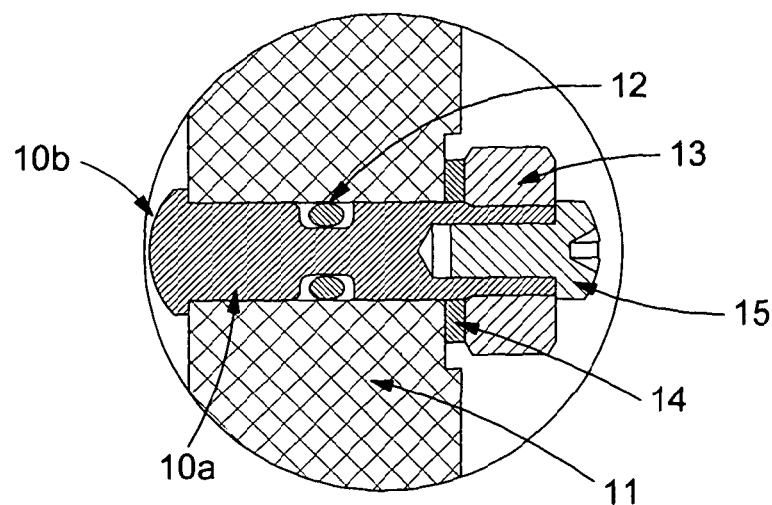
FIG. 3b depicts the electrode of FIG. 3a mounted in the wall of the flow tube of an electromagnetic flow meter.

FIG. 3a depicts an embodiment of an electrode (10) for an electromagnetic flow meter when the flow tube comprises a non-electrically conducting body. The electrode comprises an elongate body portion (10a) and a head portion (10b). As shown in FIG. 3b, the electrode is mounted on the flow tube such that the head portion is arranged on the inner side of the flow tube so it can form a contact with the flowing fluid and the body portion extends through an aperture in the wall of the flow tube (11) and protrudes beyond the flow tube. An O-ring seal (12) is arranged between the body portion and the internal surface of the aperture so as to form a seal between the electrode and the flow tube. The O-ring seal may be mounted in a circumferential groove formed on the body portion of the electrode. The electrode may be secured to the flow tube using any suitable securing means, such as a retaining nut (13). A rubber washer (14) may be arranged between the retaining nut and the external surface of the flow tube. The electrode may be electrically connected to an electrical cable using an suitable coupling means, such as a screw connector (15).

4e. The Housing

Figure 4:
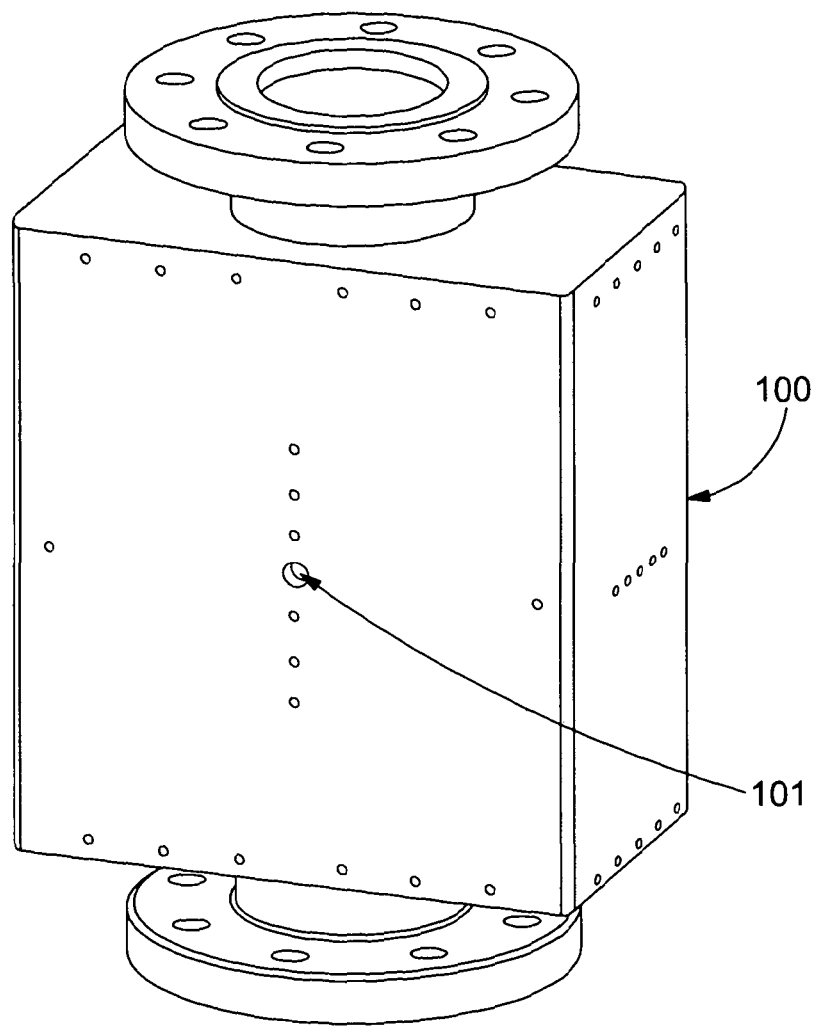

FIG. 4 depicts an embodiment of a flow meter whereby the flow tube and array of electrodes may be located (encased) in a housing (100). The housing preferably acts as a Faraday cage so as to prevent external electrical fields from interfering with the induced voltages measure at the electrodes. The housing preferably acts as a magnetic shield so as to prevent external magnetic fields from interfering with the operation of the flow meter and also prevent "leakage" of the magnetic field generated by the means for generating a magnetic field into the surrounding environment.

The housing may comprise an aperture (101) through which an electrical cable may extend from the electrode array to the processing means.

4f. The Processing Means

The flow meter comprises processing means for determining at least the axial velocity profile of the conducting fluid.

The processing means is configured to determine the axial velocity profile by calculating the axial velocity of the conducting fluid in each pixel of the flow cross-section.

The processing means comprises means to calculate the axial velocity of the conducting fluid in each pixel of the flow cross section using an inverted matrix. The processing means comprises means to derive the axial velocity of the conducting fluid in each pixel of the flow cross section using equation 5 when a single magnetic field projection is applied. The processing means comprises means to derive the axial velocity of the conducting fluid in each pixel of the flow cross section using equation 8 when multiple magnetic field projections are applied.

The processing means may comprise means to determine the weight function values of the pixel prior to determining the axial velocity profile of the conducting fluid.

Having calculated the axial velocity of the conducting fluid in each pixel, the processing means is preferably further configured to determine the volumetric flow rate of the conducting fluid.

When the conducting fluid is a conducting single phase fluid, the processing means may comprise means to calculate the volumetric flow rate using the axial velocity profile of the conducting fluid. More specifically, the processing means may comprise means to calculate the volumetric flow rate using equation 9 when the conducting fluid is a conducting single phase fluid.

When the conducting fluid is a conducting continuous phase of a multiphase fluid, the processing means may be configured to derive the volumetric flow rate using the axial velocity profile and local volume fraction distribution of the conducting fluid.

The processing means may comprise means for measuring the local volume fraction distribution of the conducting fluid using an electrical resistance tomography technique or an impedance cross correlation technique.

The processing means may be configured to determine flow characteristics of each phase of a multiphase fluid. For example, the processing means may be configured to determined the axial velocity profiles, local volume fraction distributions and/or volumetric flow rates of the conducting continuous phase and the at least one dispersed phase.

The processing means may be configured to control the operation of the flow meter.

The processing means may be a microcontroller. One example of a suitable microcontroller is the Microrobotics VM-1 microcontroller. The processing means may comprise any suitable hardware, operating systems and/or software.

The processing means may comprise display means for displaying the calculated flow characteristics of the fluid.

The processing means may be configured to control the operation of the means for generating the magnetic field. For example, the processing means may comprise means for controlling the flow of current to the means for generating a magnetic field (e.g. the Helmholtz coil). In one embodiment, the means for controlling the flow of current supplies a sinusoidal current to the Helmholtz coil to achieve a time varying magnetic field. In another embodiment, the means for controlling the flow of current (such as the coil excitation circuit shown in FIG. 5) may apply a hybrid square wave current (as shown in FIG. 6) to the Helmholtz coil (Coil 1, Coil 2) to achieve a time varying magnetic field. The hybrid square wave current may complete a cycle in approximately 0.5 seconds or less.

Figure 5:
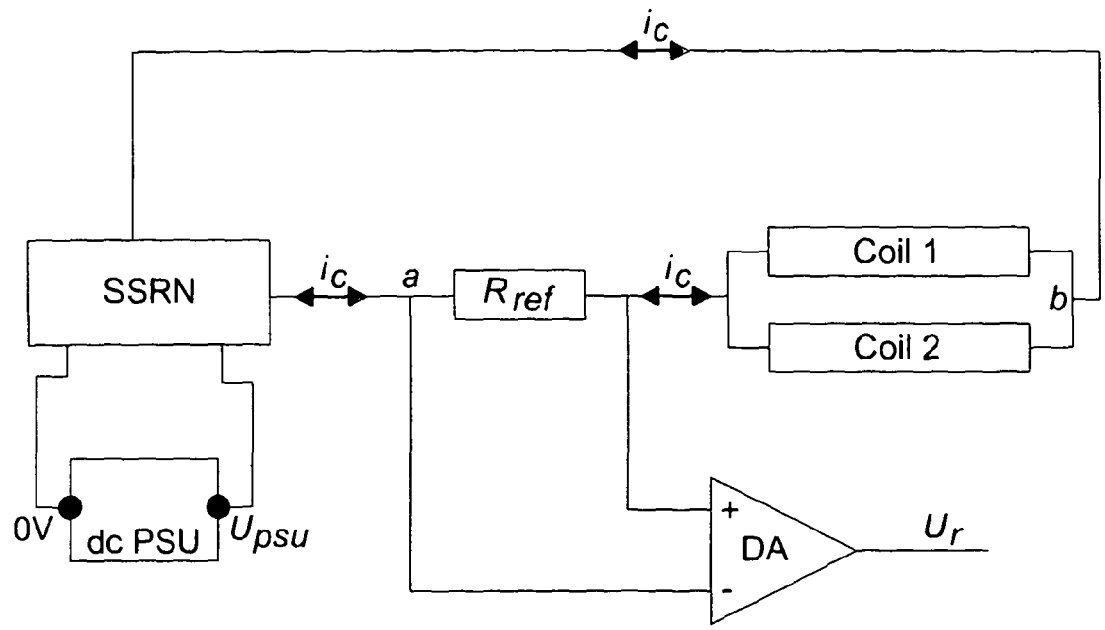
FIG. 5 depicts a combined coil excitation and temperature compensation circuit for an electromagnetic flow meter according to the invention.
Figure 6:
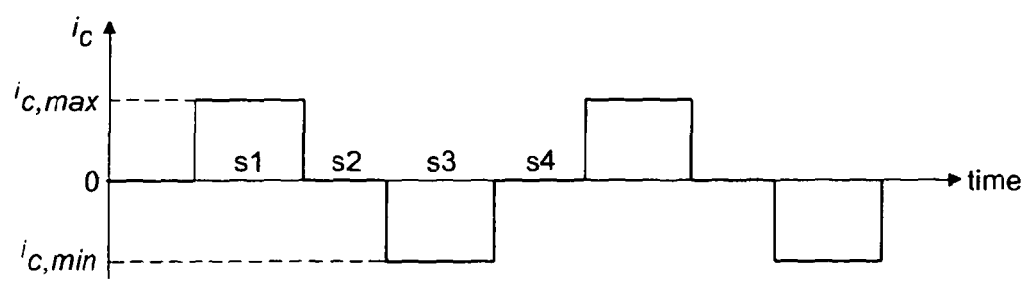
FIG. 6 depicts a graph showing how the coil current varies with time.

With reference to the coil excitation circuit shown in FIG. 5, the dc power supply unit (dc PSU) is connected to a network of solid state relays. The solid state relay network (SSRN) is controlled by the processing means in such a way that at any instant in time the voltages applied at points 'a' and 'b' in FIG. 5 are as per the table below.

| Relay Position | Voltage at 'a' | Voltage at 'b' |
|---|---|---|
| RP1 | $U_{psu}$ | 0 |
| RP2 | 0 | 0 |
| RP3 | 0 | $U_{psu}$ |

When the voltage at a is $U_{psu}$ and the voltage at b is 0 the maximum current $i_{c,max}$ flows to the coils (see FIG. 6). When the voltage at a is 0 and the voltage at b is $U_{psu}$ the minimum current $i_{c,min}$ flows to the coils (where $i_{c,min}=-i_{c,max}$). When the voltages at a and b are both 0, no current flows to the coils.

The two coils of the Helmholtz coil (Coil 1, Coil 2) are closely matched and the resistance $R_c$ of each coil has a known value of $R_{c,15}$ when the coils are at a temperature of 15° C. However, the ambient temperature variations and the heating of the coils due to the coil current cause the value of $R_c$, and thereby $i_{c,max}$, to vary with time. As explained above, the flow induced voltages $U_j$ from which the flow velocity profile is reconstructed are proportional to $B_{max}$—the maximum value of the mean magnetic flux density in the flow cross section. In turn, $B_{max}$ is proportional to $i_{c,max}$ whereby $$B_{max}=Ki_{c,max} \tag{14}$$

where K is a known constant.

Therefore, accurate velocity profile reconstruction relies upon knowing $B_{max}$ at all times and so it is necessary to know $i_{c,max}$ at all times. Accordingly, the processing means preferably comprises a temperature compensating circuit to determine $i_{c,max}$ and thereby $B_{max}$.

FIG. 5 depicts an example of a temperature compensating circuit whereby the coil current $i_c$ is passed through the high tolerance reference resistor with a known resistance $R_{ref}$. The reference resistor has a very low temperature coefficient. A voltage $U_r$ appears across $R_{ref}$ and is fed to the processing means via a differential amplifier (DA). $U_r$ is then measured by the analogue to digital converters within the processing means.

It is known that the maximum value of $U_r$ is $U_{r,max}$
where $U_{r,max}=R_{ref}i_{c,max}$. (15)

Since $R_{ref}$ is known and $U_{r,max}$ is measured by the processing means $i_{c,max}$ can be calculated from equation 15.

Since K is known $B_{max}$ can then be calculated from equation 14, thereby enabling the true value of the maximum mean magnetic flux density to be used at all times in the velocity reconstruction calculations.

Figure 7:
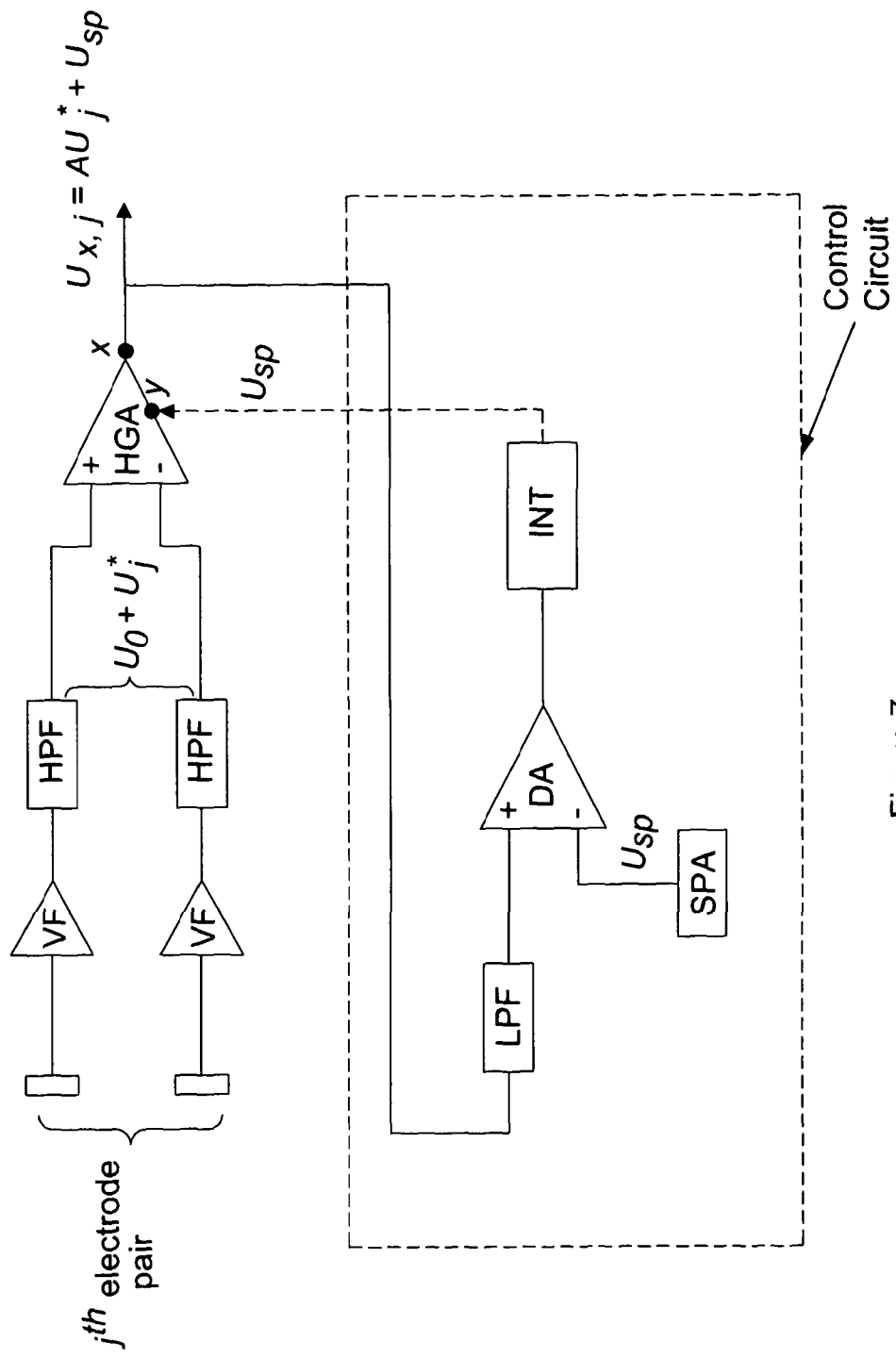
FIG. 7 depicts a voltage measuring circuit for collating the voltage measured between the jth pair of electrodes and a control circuit for eliminating the effects of an unwanted voltage $U_o$.

The processing means may be further configured to collate the potential difference measurements in each pixel. The processing means may comprise means for collating the potential difference between each pair of electrodes. For example, FIG. 7 depicts an example of a voltage measuring circuit suitable for collating the potential difference measurements between a pair of electrodes. In FIG. 7, a voltage measurement is being made between the jth pair of electrodes. Note that a circuit such as that shown in FIG. 7 is necessary for each pair of electrodes between which is required to make a voltage measurement. Hence, for a flow meter comprising 16 electrodes and requiring 15 voltage measurements, 15 such circuits are required.

It can be seen that in the voltage measuring circuit of FIG. 7, a time dependent flow induced voltage $U^*_j$ appears between the $j^{th}$ caused electrode pair. The induced voltage $U^*_j$ is caused by the interaction of the flowing fluid and the imposed magnetic field.

A voltage $U_j$ necessary for reconstructing the velocity profile is extracted from $U^*_j$ at the processing means sing appropriate signal processing techniques.

Because the applied magnetic field varies rapidly (it may be a sine wave or a hybrid square wave signal) $U^*_j$ is also a rapidly varying signal. Typically the amplitude of $U^*_j$ is only a few millivolts and so before being sampled by the analogue to digital converter in the processing means it must be amplified by a high gain differential amplifier (HGA) which has gain A, where A is typically equal to 1000. A voltage follower (VF) and a high pass filter (HPF) are used to condition the signals from the electrodes prior to being passed to HGA.

The high pass filters (HPF) are used to eliminate a very large dc offset which can appear on each electrode due to the effects of polarisation and accumulation of static charges. The output voltage $U_{x,j}$ from the high gain amplifier (HGA) is fed to the processing means. However, despite the high pass filters (HPF), the differential voltage at the input to HGA consists of the sum of $U^*_j$ and a residual, unwanted slowly varying dc voltage $U_0$ due to the effects of polarisation and accumulation of static charges at the electrodes. $U_0$ is generally larger than the amplitude of $U^*_j$. If the effects of $U_0$ are not eliminated then the voltage $U_{x,j}$ at point x in FIG. 7 would be given by $U_{x,j}=A(U_o+U^*_j)$ and the resultant (slowly varying) dc component $AU_o$ would make the value of $U_{x,j}$ lie well outside of the range of operation of the analogue to digital converters on the processing means.

Accordingly, the processing means preferably comprises a control circuit to compensate for the effects of $U_0$. FIG. 7 depicts an example of a control circuit that is configured to compensate for the effects of $U_0$ by applying a suitable offset (or reference) voltage to HGA at point y. In this way, the output voltage $U_{x,j}$ is given by $U_{x,j}=AU^*_j+U_{sp}$ where $U_{sp}$ is a 'set point' voltage provided by adjusting the 'set point adjust' circuit (SPA) in a once only operation. In many cases $U_{sp}$ will be chosen to have a value of 0V in which case the voltage $U_{x,j}$ fed to the processing means will simply be given by $U_{x,j}=AU^*_j$.

The control circuit depicted in FIG. 7 comprises a low pass filter (LPF), a differential amplifier (DA), a set point adjustor (SPA) and an integrator (INT).

When the processing means comprises the coil excitation circuit, temperature compensation circuit, voltage measurement circuit and control circuit as depicted in FIGS. 5 and 7, the operation of the solid state relay network to control the current $i_c$ applied to the coils can be as follows:

(i) When the SSRN is in position RP1 the maximum positive coil current $i_{c,max}$ flows in the Helmholtz coil resulting in a magnetic field of mean flux density $+B_{max}$ in the flow cross section, the positive sign indicating that the direction of the magnetic field is from Coil 2 to Coil 1 (FIG. 5). This maximum coil current $i_{c,max}$ occurs at part s1 of the coil current cycle shown in FIG. 6. With reference to FIG. 7, the voltage $U_{x,j}$ at the output from the $j^{th}$ 'voltage measurement and control' circuit, at part s1 of the coil current cycle, is denoted $(U_{x,j})_1$ where $$(U_{x,j})_1 = AU_j^+ + U_{sp} \tag{16}$$

and where $U_j^+$ is the required 'positive' flow induced voltage between the $j^{th}$ electrode pair. The voltages $(U_{x,j})_1$ (where, for example, j=1 to 15) are measured by the Analogue to Digital Converters (ADCs) of the processing means.

(ii) When the SSRN is in position RP2 no coil current flows and so no magnetic field is present between Coil 1 and Coil 2. This corresponds to part s2 of the coil current cycle (FIG. 6). The output voltage from the $j^{th}$ 'voltage measurement and control' circuit is denoted $(U_{x,j})_2$ where $$(U_{x,j})_2 = U_{sp} \tag{17}$$

The voltages $(U_{x,j})_2$ are measured by the ADCs of the processing means.

(iii) When the SSRN is in position RP3 the minimum coil current $i_{c,min}$ flows where $i_{c,min}=-i_{c,max}$. A magnetic field of mean flux density $-B_{max}$ now occurs between Coils 1 and 2, the negative sign indicating that the direction of the magnetic field is from Coil 1 to Coil 2 (FIG. 5). This corresponds to part s3 of the coil current cycle. The output from the $j^{th}$ 'voltage measurement and control' circuit is now $(U_{x,j})_3$ where $$(U_{x,j})_3 = AU_j^- + U_{sp} \tag{18}$$

where $U_j^-$ is the required 'negative' flow induced voltage between the $j^{th}$ electrode pair (and where $U_j^- \approx -U_j^+$ if the flow Velocity distribution has not changed significantly from s1 to s3). The voltages $(U_{x,j})_3$ are measured by the ADCs of the processing means.

(iv) For part s4 of the coil current cycle the SSRN is again set to position RP2 so that no current flows in the coils. The output voltage from the $j^{th}$ 'voltage measurement and control' circuit is denoted $(U_{x,j})_4$ where $$(U_{x,j})_4 = U_{sp} \tag{19}$$

The voltages $(U_{x,j})_4$ are measured by the ADCs of the processing means.

(v) For a given coil current cycle, the $j^{th}$ potential difference measurement $U_j$ required for the pixel velocity calculation is determined by the processing means using $$U_j = \frac{((U_{x,j})_1 - (U_{x,j})_2) - ((U_{x,j})_3 - (U_{x,j})_4)}{2A} \tag{20}$$

From equations 19 and 20 it can be seen that $U_j$ is given by $$U_j = \frac{U_j^+ + |U_j^-|}{2} \tag{21}$$

A summary of the relay positions, coil currents, magnetic flux densities and 'voltage measurement and control' circuit output voltages is given in the table below.

| Relay Positions | Total Coil Current | Mean Magnetic Flux Density | Part of coil current cycle | $U_{x,j}$ |
| --- | --- | --- | --- | --- |
| RP1 | $i_{c,max}$ | $B_{max}$ | s1 | $(U_{x,j})_1 = AU_j^+ + U_{sp}$ |
| RP2 | 0 | 0 | s2 | $(U_{x,j})_2 = U_{sp}$ |
| RP3 | $i_{c,min} = -i_{c,max}$ | $-B_{max}$ | s3 | $(U_{x,j})_3 = AU_j^- + U_{sp}$ |
| RP2 | 0 | 0 | s4 | $(U_{x,j})_4 = U_{sp}$ |

The values of $U_j$ given by equation 21 may be calculated for a single coil current cycle or they may be averaged using the processing means over G coil current cycles where G may take user specified values of, for example, 1, 2, 5 etc. The required value of G may be entered into the processing means software by the user via a touch screen display. Under steady state flow conditions, the larger the value of G the more accurate will be the values of $U_j$. Under transient flow conditions however the larger the value of G the slower will be the speed of response of the flow meter in calculating the time dependent flow velocities in the pixels.

During each coil current cycle (preferably once during each coil current cycle) the maximum voltage drop $U_{r,max}$ across the reference resistance $R_{ref}$ is measured using the ADCs of the processing means. The maximum value $B_{max}$ of the mean magnetic flux density in the flow cross section is then determined by the processing means software, using equation 22 which was derived from equations 14 and 15

$$B_{max} = K \frac{U_{r,max}}{R_{ref}} \tag{22}$$

For the specific case where a single magnetic field projection is used, the mean magnetic flux density term $\overline{B}$ used in the calculation of the pixel velocities is set equal to $B_{max}$ in the processing means software.

$$\overline{B} = B_{max} \tag{23}$$

Again for the specific case where a single magnetic field projection is used, the processing means software may now calculate the flow velocity $v_i$ in the $i^{th}$ pixel (i=1 to 15, say) using $$V = \frac{\pi a}{2\overline{B}}[WA]^{-1} U \tag{24}$$

where V is the matrix containing the calculated pixel velocities $v_i$, w is a matrix of the electromagnetic flow meter weight functions $w_{ij}$ which are stored in the processing means software, A is a matrix of the pixel areas $A_i$ which are stored in the processing means software and U is a matrix constructed from the measured potential differences $U_j$ given by equation 20. The term a in equation 24 is the internal radius of the flow cross section of the flow meter body. [Note that for a single phase flow $v_i$ is the conducting fluid velocity in the $i^{th}$ pixel. For a multiphase flow $v_i$ is the velocity of the conducting continuous phase in that pixel].

The values of the pixel velocities $v_i$ may be displayed on the processing means display either graphically or 'alphanumerically'. In a single phase flow, and for a 15 pixel system, the total liquid flow rate $Q_c$ is calculated and displayed by the processing means using equation 25 below.

$$Q_c = \sum_{i=1}^{15} v_i A_i \tag{25}$$

The processing means preferably operates continuously, updating the display of the pixel velocities $v_i$ and of $Q_c$ after every G coil current cycles

5. A First Example of an Electromagnetic Flow Meter

The following description relates to an embodiment of an electromagnetic flow meter according to the present invention. The description describes how the weight function values of each pixel can be calculated for the flow meter. The description describes how the volumetric flow rate of a conducting single phase fluid (water) may be determined by the flow meter from the weight values and boundary voltage measurements. The description describes how the volumetric flow rate of a conducting single phase fluid having a uniform velocity profile across the cross-section of the flow tube may be determined using the flow meter. The description also describes how the volumetric flow rate of a conducting fluid having a non-uniform velocity profile across the cross-section of the flow tube may be determined using the flow meter.

5a. The Geometry of the Electromagnetic Flow Meter

This particular flow meter consists of a PTFE (polytetrafluoroethylene) flow pipe (T) mounted within Helmholtz coils (C1, C2). The flow meter contains 16 equispaced electrodes located at the plane z=0. The inner diameter of the flow pipe is 0.08 m, the outer diameter is 0.09 m and its axial length is 0.3 m. The inner and outer diameters of the two coils are 0.2048 m and 0.2550 m respectively. A cylindrical domain with a diameter of 0.32 m and a length of 0.32 m represents the boundary of the computing domain (refer to FIGS. 8a and 8b).

Figures 9, 10:
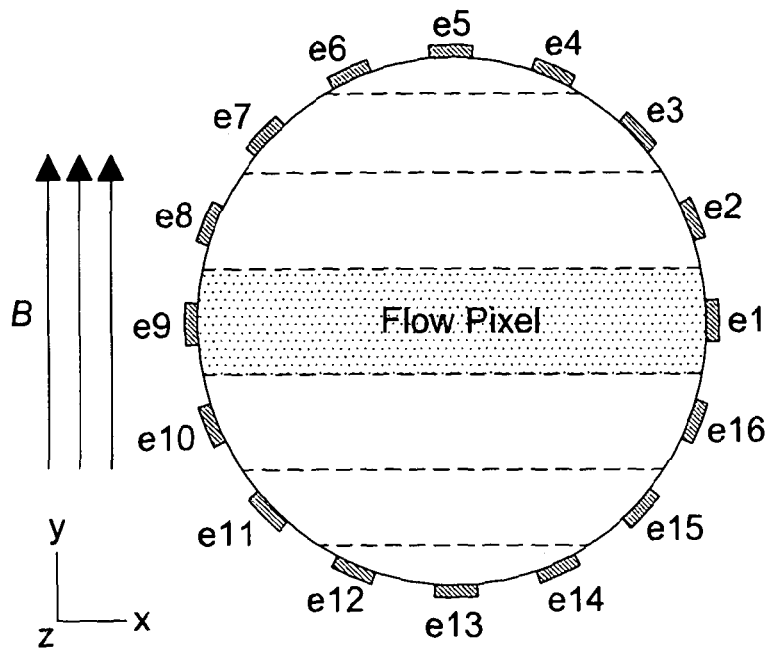

In order to measure the relevant potential differences electrode pairs are arranged at the internal boundary of the flow pipe (at the plane z=0), these electrodes being in contact with the flowing medium. Sixteen electrodes are placed at angular intervals of 22.5 degrees on the flow pipe boundary (refer to FIG. 9) the electrodes being denoted e1, e2 etc, with electrode e5 at the top of the flow cross section and electrode e13 at the bottom of the flow cross section. For this simple flow meter geometry the flow cross section is divided into seven pixels. The geometry of these seven pixels is chosen such that the chords joining seven pairs of electrodes are located at the geometric centres (in the y direction) of the pixels (refer to FIG. 9). The fluid pixels are categorized as pixel 1 at the top of the flow cross section to pixel 7 at the bottom of the flow cross section. The pixel areas $A_i$ are shown in the table depicted in FIG. 10. Seven potential difference measurements can be made between the seven electrode pairs as shown in the table of FIG. 10 (the $j^{th}$ potential difference measurement $U_1$ was made between the $j^{th}$ electrode pair shown in the table of FIG. 10 1). The local magnetic flux density B is perpendicular to both the flow direction and to the chords joining the electrode pairs.

5b. Magnetic Flux Density Distribution of the Electromagnetic Flow Meter

In the embodiment of the flow meter a Helmholtz coil is used to produce a nearly uniform local magnetic flux density distribution.

Figure 8A:
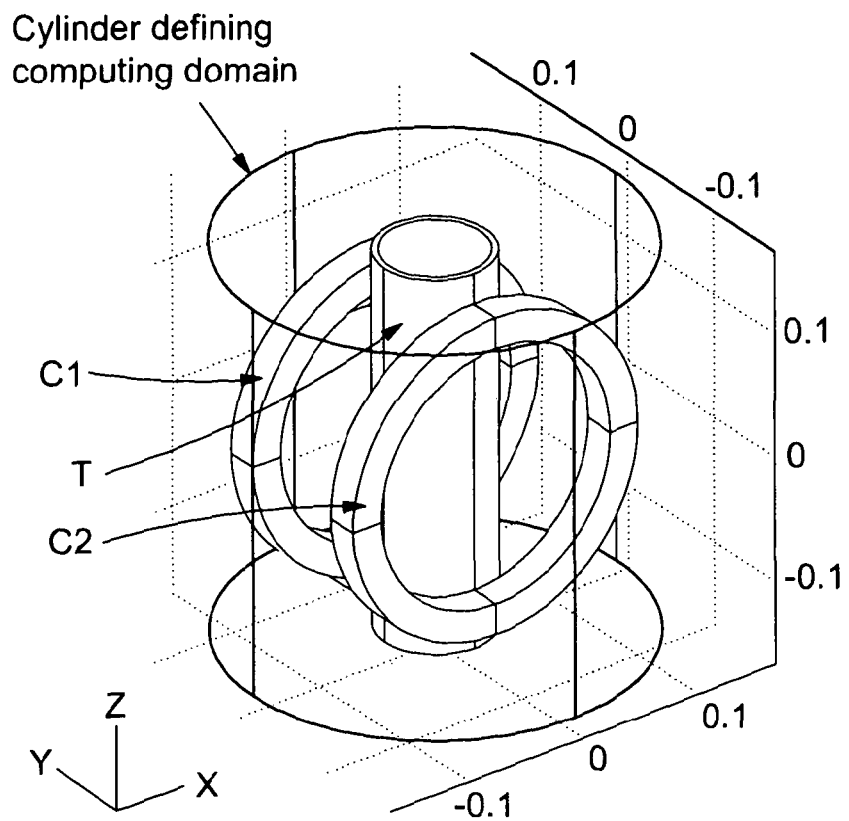
FIG. 8a depicts a 3-dimensional schematic diagram of an example of a flow meter where the flow tube defines the computing domain.
Figure 8B:
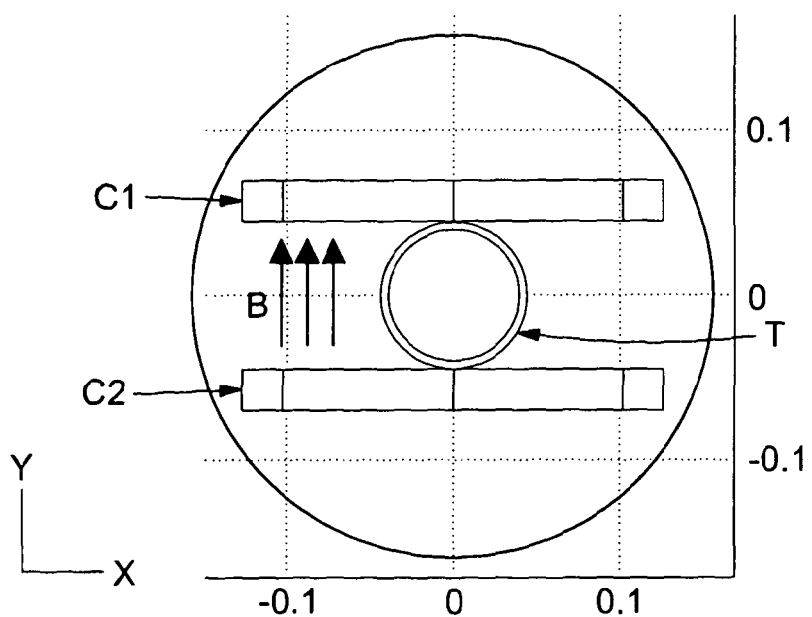

The Helmholtz coil consists of two identical circular electromagnetic coils. In the flow meter design these coils are placed symmetrically on each side of the PTFE flow pipe as shown in FIGS. 8a and 8b. The system is designed such that the current flows through both coils in the same direction and each coil carries an equal amount of electric current giving rise to a relatively uniform magnetic flux density distribution in the flow cross section. The magnitude of the magnetic flux density in the y direction is relatively constant and has a maximum value of $7.757 \times 10^{-4}$ T and minimum value of $8.044 \times 10^{-4}$ T in the flow cross section. The mean value $\overline{B}$ of the magnitude of the y component of the magnetic flux density in the flow cross section is $7.996 \times 10^{-4}$ T (7.996 gauss).

Figure 11B:
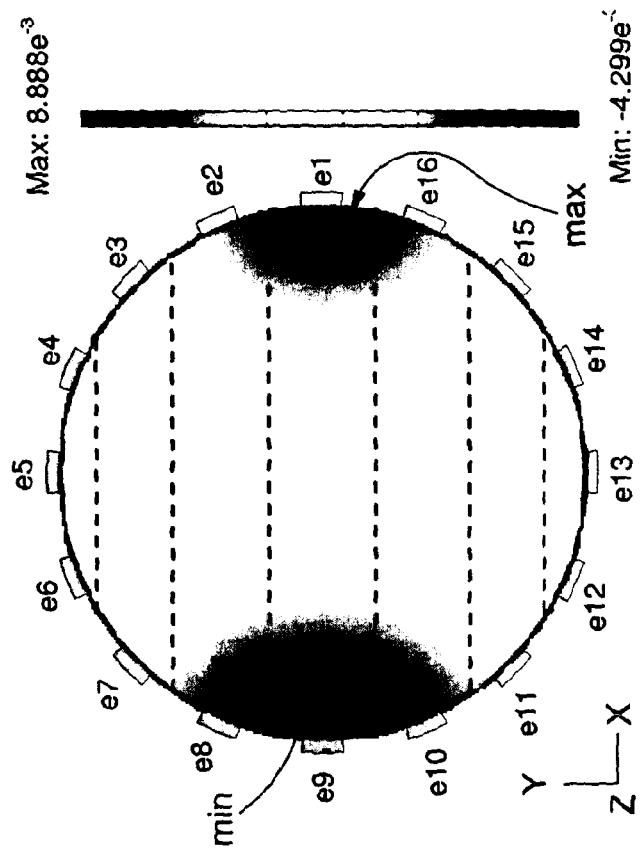
FIG. 11b depicts the electrical potential on the z-plane when simulating a flow meter to determine weight values.
Figure 11A:
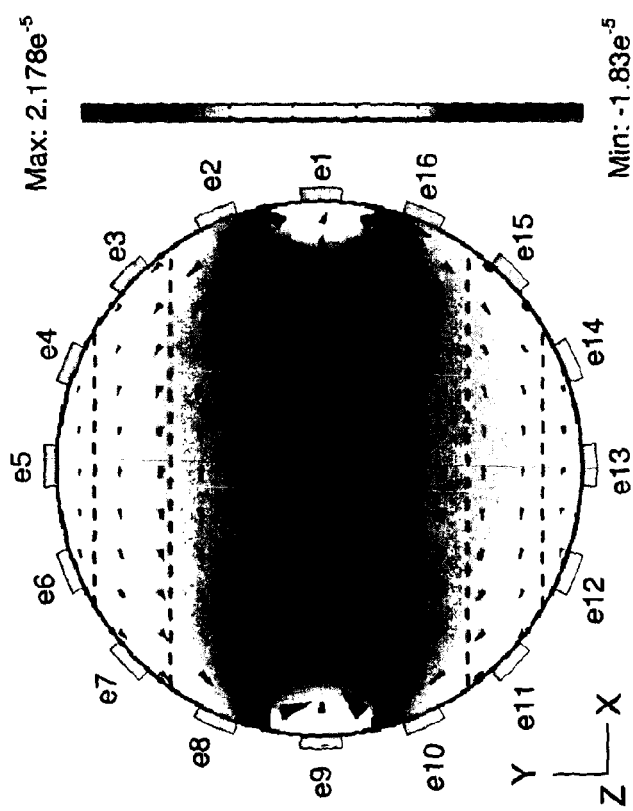
FIG. 11a depicts a distribution of the Lorentz force per unit volume when simulating a flow meter to determine weight values.

5c. Determining the Weight Function Values of Each Pixel of the Electromagnetic Flow Meter The weight values $w_{ij}$ of each pixel relate to the axial velocity $v_i$ in the $i^{th}$ pixel to the $j^{th}$ potential difference measurement $U_j$. The weight function values can be determined by simulating the flow meter using COMSOL Multiphysics software. As part of the simulation process, the flow channel is divided into seven pixels as described above (refer to FIG. 9). The condition of the simulation is that the fluid in the pixel for which weight values are to be calculated is given a flow velocity of greater than zero in the z direction whilst the remaining pixels all have zero fluid velocity. FIGS. 11a and 11b show the distribution of the Lorentz forces and the induced electrical potentials when the fluid in pixel 4 has an imposed velocity in the z direction while the fluid in the remaining fluid pixels is at rest. FIG. 11(a) illustrates the Lorentz force distribution arising from the imposed velocity in pixel 4. The magnetic field interacts with the charges carried in the water via these Lorentz forces causing the separation of charged ions (positive and negative) and giving rise to the electrical potential distribution shown in FIG. 11(b). The arrows shown in FIG. 11(a) also represent the direction of the local induced current density and it can be seen that for the (highly contrived) case in which flow occurs in pixel 4 only there is circulation of the electric current.

Figure 12A:
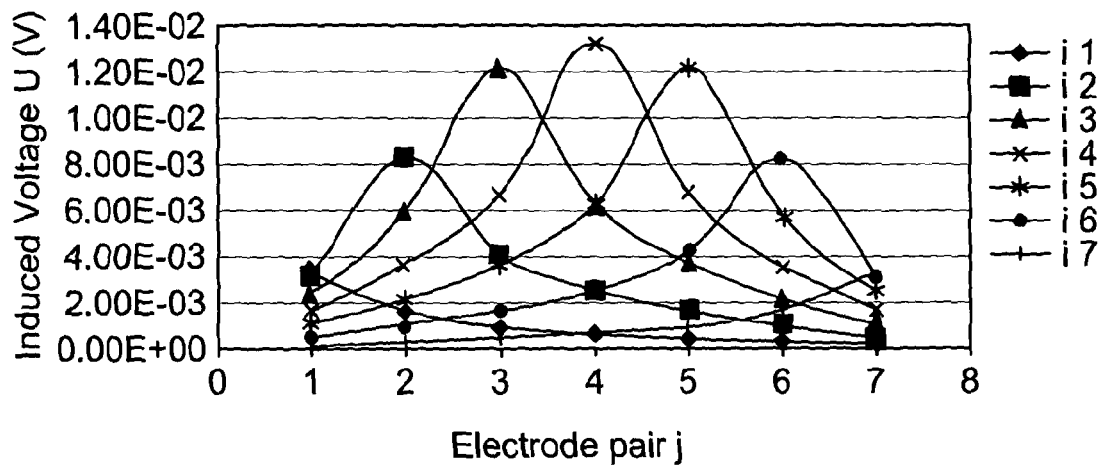
FIG. 12a depicts the induced voltages when simulating a flow meter to determine weight values.
Figure 12B:
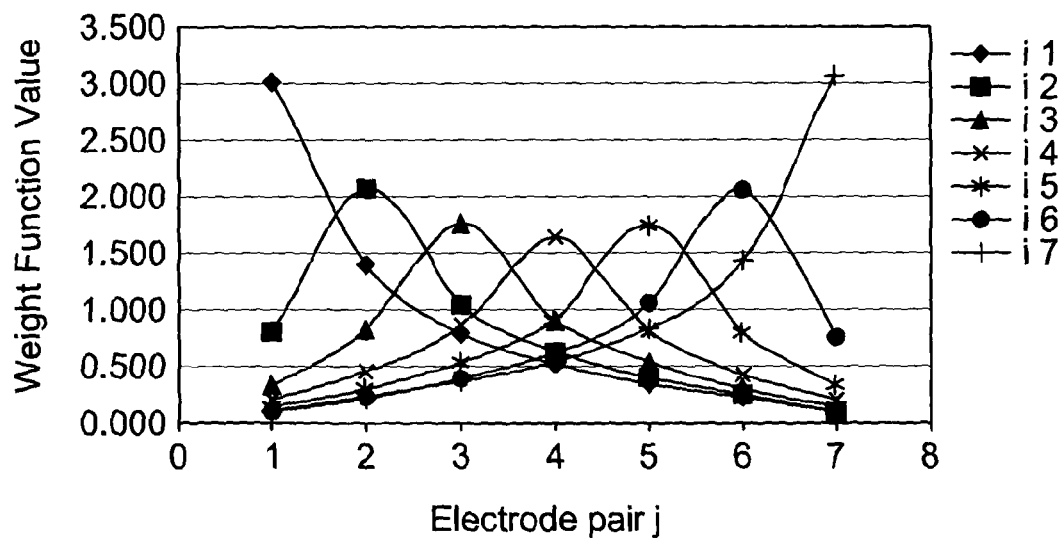

From the potential distribution given in FIG. 11(b) the seven potential differences $U_j$ between the 7 electrode pairs given in the Table of FIG. 10 can be calculated allowing all of the weight values $w_{4j}$ associated with pixel 4 to be calculated according to equation 4 (with i=4 and j=1 to 7). The process is then repeated for each of the other six pixels in succession until all relevant 49 weight values have been calculated. FIG. 12(a) shows the induced voltages plotted against electrode pairs for all of the seven simulations. [Note that the very large simulated pixel velocity of 500 ms$^{-1}$ was used to improve the accuracy of the weight values calculated using COMSOL]. FIG. 12(b) shows the 49 weight values calculated from the induced voltages given in FIG. 8(a) by using equation 26.

$$w_{ij} = U_j \frac{\pi a}{2B} \frac{1}{v_i A_i} \quad (26)$$

5d. Determining the Velocity Profile of a Conducting Fluid

Two different velocity profiles were investigated using the flow meter:—a uniform velocity distribution and a non-uniform (linear) velocity distribution as described below.

5e. The Uniform Velocity Profile

FIGS. 13a and 13b shows the effect of a uniform velocity distribution of 50 ms$^{-1}$ in the flow cross section on the Lorentz force distribution and the electrical potential distribution. The conducting fluid may be a single phase flow or the conducting continuous phase of a multiphase flow.

5f. A Non-Uniform Velocity Profile

FIGS. 14a and 14b shows the effect of a non-uniform velocity distribution in the flow cross section on the Lorentz force distribution and the electrical potential distribution. The flow velocity $v_z$ in the z direction is given by the expression $$v_z = 1 + \left(\frac{y}{a}\right) \quad (27)$$

where y is the coordinate defined in FIGS. 14a and 14b and a is the internal pipe radius. This results in $v_z$ varying linearly from zero at y=−0.04 m to 2 ms$^{-1}$ at y=0.04 m. This type of non-uniform velocity profile is non-axisymmetric and has a linear velocity distribution in the flow cross section. The non-uniform velocity profile can occur in single phase flows where flow is some how restricted (e.g. by a bend in the pipe or a partially opened valve.) Alternatively, this type of non-uniform velocity profile can occur in multiphase flows, for example, inclined multiphase flows.

The relevant induced voltages $U_j$ for the uniform velocity profile and linear velocity profile were measured using the electrode pairs shown in the table of FIG. 10. It should be noted that the electrical potential distribution for the uniform velocity profile and non-uniform velocity profile are entirely different from each other. For the uniform velocity distribution the induced voltages between pairs 1, 2 and 3 are the same as for pairs 7, 6, and are respectively. For the non-uniform velocity profile the induced voltage between pair 1 is higher than that for pair 7. Similarly the induced voltages between pairs 2 and 3 are respectively higher than for pairs 6 and 5. Moreover, for the non-uniform velocity profile the highest induced potential is between electrode pair 3 while the maximum induced voltage for the uniform velocity profile is between electrode pair 4.

As mentioned earlier, the predetermined weight function values $w_{ij}$ and measured induced voltages are used to determine the mean velocity $v_i$ in each pixel. For a conducting single phase fluid, the method can be expressed simply by the following matrix equation $$V = \frac{\pi a}{2B}[WA]^{-1}U \quad (5)$$

in which V is a single column matrix containing the pixel velocities $v_i$, W is a square matrix containing the relevant weight values $w_{ij}$, A is a square matrix containing information on the pixel areas $A_i$ and U is a single column matrix containing the calculated potential differences $U_j$ for a given imposed velocity profile.

Figure 15A:
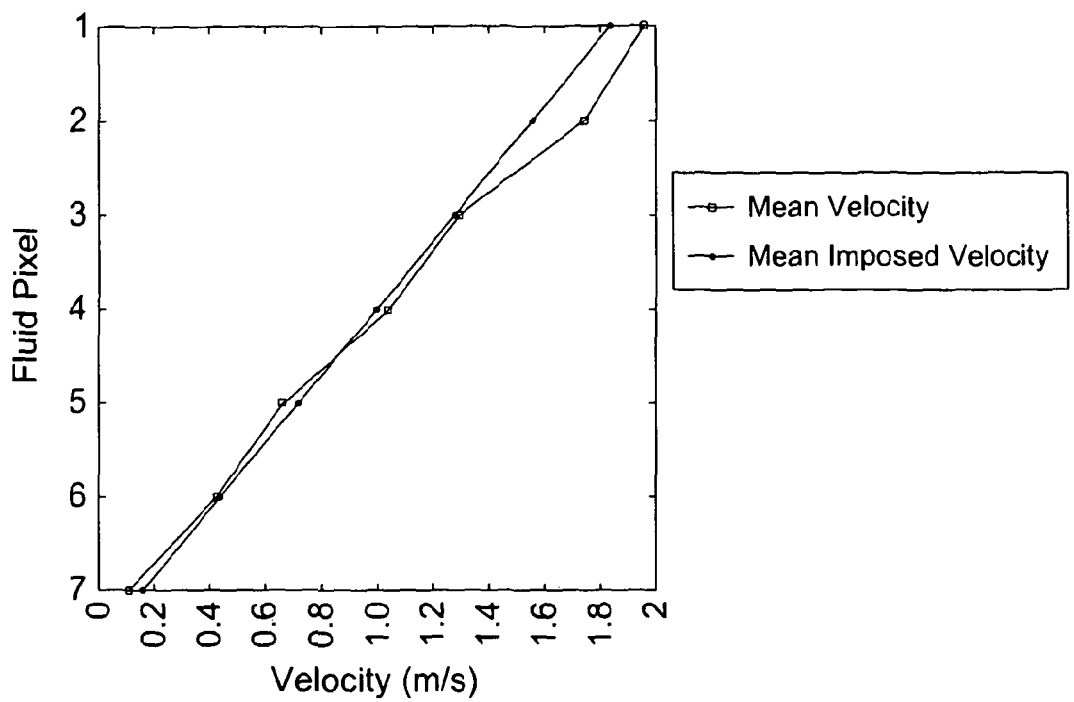
FIG. 15a depicts the axial velocity profile of a conducting fluid with a uniform flow profile.
Figure 15B:
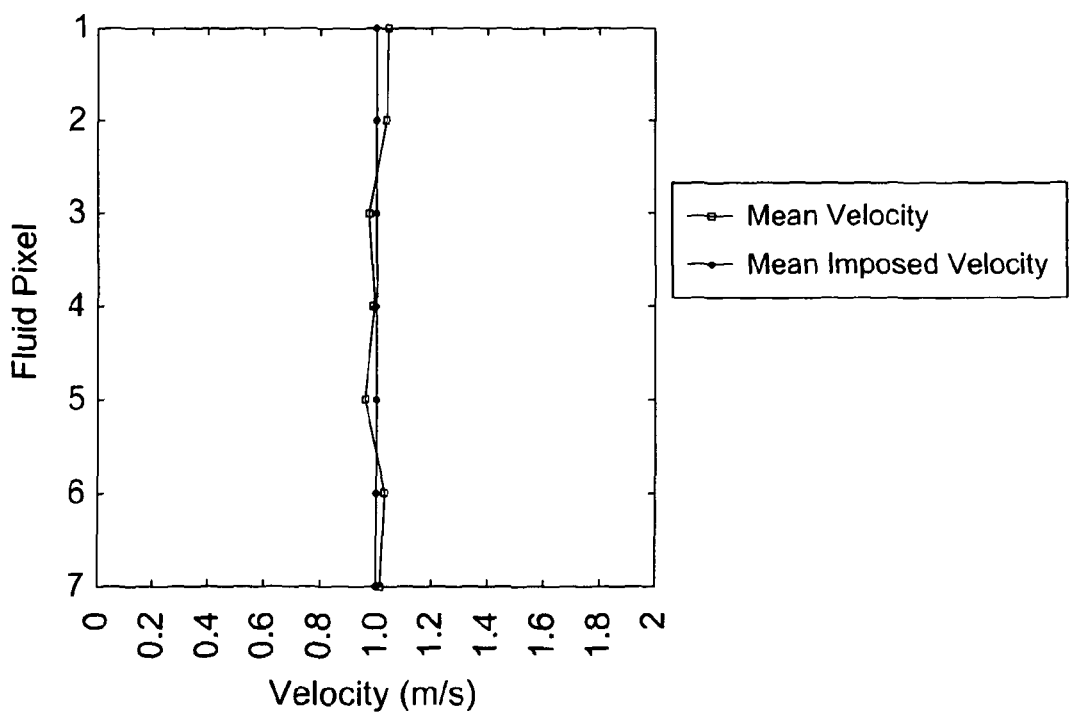
FIG. 15b depicts the axial velocity profile of a conducting fluid with a non-uniform flow profile.

The two velocity profiles of water as determined by the flow meter are shown in FIGS. 15(a) and 15(b). Also shown in FIGS. 15(a) and 15(b) are the imposed/reference velocity profiles that were measured using other detection means. The reference velocity profiles may be determined for example by using a laser Doppler anemometry device, hot wire anemometry device or a pitot-static tube.

With close inspection of FIGS. 15a and 15b it can be seen that the velocity profiles determined by the flow meter have excellent agreement with the reference velocity profiles for both the uniform and non-uniform velocity profiles. FIG. 15(a) shows that for the uniform velocity profile the maximum (most overestimated) and minimum (most under estimated) errors occur in pixel 1 (+4.565%) and pixel 5 (−3.33%) respectively. The most accurate velocity is in pixel 4 with an error of only 0.722%. The non-uniform velocity profile has maximum and minimum errors in pixels 2 and 7 respectively. The most accurate velocities for the non-uniform velocity profile are in pixels 3 and 6 with errors of +0.912% and −0.797% respectively.

The total volumetric flow rate $Q_w$ of the water can be calculated from the determined velocity profile as follows;

$$Q_w = \sum_{i=1}^{7} A_i v_i \quad (9)$$

in which $Q_w$ is the water volumetric flow rate, $A_i$ is the area of the $i^{th}$ pixel, and $v_i$ is the axial velocity in the $i^{th}$ pixel. Let the true volumetric flow rate associated with the imposed (reference) uniform velocity profile be $Q_{wiu}$ and the volumetric flow rate associated with the calculated (determined) uniform velocity profile be $Q_{wru}$. Also, let the true volumetric flow rate associated with the imposed (reference) non-uniform velocity profile is $Q_{wil}$ and the volumetric flow rate associated with the calculated (determined) non-uniform velocity profile is $Q_{wrl}$.

For the uniform velocity profile $Q_{wiu}$ is calculated to be $2.509 \times 10^{-1}$ m$^3$ s$^{-1}$ and $Q_{wru}$ is found to be $2.503 \times 10^{-1}$ m$^3$ s$^{-1}$. There is thus an error of only −0.238% in the total volumetric flow rate obtained from the calculated uniform velocity profile.

For the non-uniform velocity profile $Q_{wil}$ is calculated to be $5.026 \times 10^{-3}$ m$^3$ s$^{-1}$, and $Q_{wrl}$ is calculated to be $5.147 \times 10^{-3}$ m$^3$ s$^{-1}$. There is thus an error of only +2.413% in the total volumetric flow rate obtained from the non-uniform velocity profile. It is believed that this error could be further reduced by improving the spatial resolution of the flow meter. This may be achieved by using a greater number of pixels. As discussed the flow tube cross-section may be divided into a greater number of pixels by increasing the number of electrodes and/or applying multiple magnetic flux density distributions.

6. A Second Example of an Electromagnetic Flow Meter

The following description relates to a flow meter that is suitable for monitoring the flow of a two phase fluid. The fluid comprises a conducting continuous phase and a dispersed phase. The flow meter is suitable for determining the axial velocity profile of the conducting continuous phase as discussed above. The flow meter further comprises an impedance cross correlation measuring means (ICC) for measuring the distribution of the local velocity $v_d$ of the dispersed phase in the flow cross section. The ICC is also able to measure the distribution of the local volume fractions of the dispersed and continuous phase ($\alpha_d$ and $\alpha_c$ respectively) in the flow cross section. Thus, by combining the flow meter and the ICC the volumetric flow rates $Q_d$ and $Q_c$ of the dispersed and continuous phases respectively can be calculated as follows:

$$Q_d = \int_A v_d \alpha_d dA \tag{a1}$$

$$Q_c = \int_A v_c \alpha_c dA \tag{a2}$$

where A is the pipe cross sectional area.

6a. Measuring the Local Volume Fraction Measurement Using the ICC

The ICC measuring means consists of two arrays of $\tilde{N}$ electrodes denoted array '$\tilde{A}$' and array '$\tilde{B}$' spaced uniformly around the internal circumference of the pipe. One of these electrode arrays may, if required, be the same as the electrode array used in the flow meter for determining the axial flow velocity of the conducting continuous phase. $\tilde{N}$ is typically equal to 8 or 16. The axial separation L of the arrays is typically 50 mm. The distributions of the local volume fractions $\alpha_d$ and $\alpha_c$ are measured using one of the arrays only (e.g. array $\tilde{B}$). A sequence I of electrical potentials is applied to the electrodes in array $\tilde{B}$, starting at electrode 'Elec1' (FIG. 16), giving rise to an Electrode Potential Rotational Pattern (EPRP) denoted $I_1$.

The potential applied to an electrode may be 'excitation' (denoted V$^+$), 'virtual earth' (denoted ve) or 'true earth' (denoted E). For EPRP $I_1$, by measuring the fluid resistance $R_f$ between the V$^+$ and ve electrodes (using an appropriate electronic circuit) the mean mixture conductivity $\sigma_m$ in a small 'Effective Sensing Region' $R_{I,1}$ of the flow cross section can be determined.

The 'Effective Sensing Region' $R_{I,1}$ has a 'Centre of Action' denoted $C_{I,1}$ with precisely defined coordinates. If the conductivity $\sigma_w$ of the conducting continuous phase is known then the 'local' dispersed phase volume fraction $\alpha_d$ in $R_{I,1}$, (and hence at $C_{I,1}$) can be determined from $\sigma_m$ using the Maxwell relationship for mixtures of conducting materials $$\alpha_d = \frac{2\sigma_w - 2\sigma_m}{\sigma_m + 2\sigma_w} \tag{a3}$$

In equation a3 it is assumed that the dispersed phase has effectively zero conductivity such as would occur, for example, in an oil-in-water flow or an air-in-water flow. The value of $\alpha_d$ thus calculated is taken as being the local dispersed phase volume fraction at the point $C_{I,1}$. The local continuous phase volume fraction $\alpha_c$ at $C_{I,1}$ is given by $$\alpha_c = 1 - \alpha_d \tag{a4}$$

Figure 16:
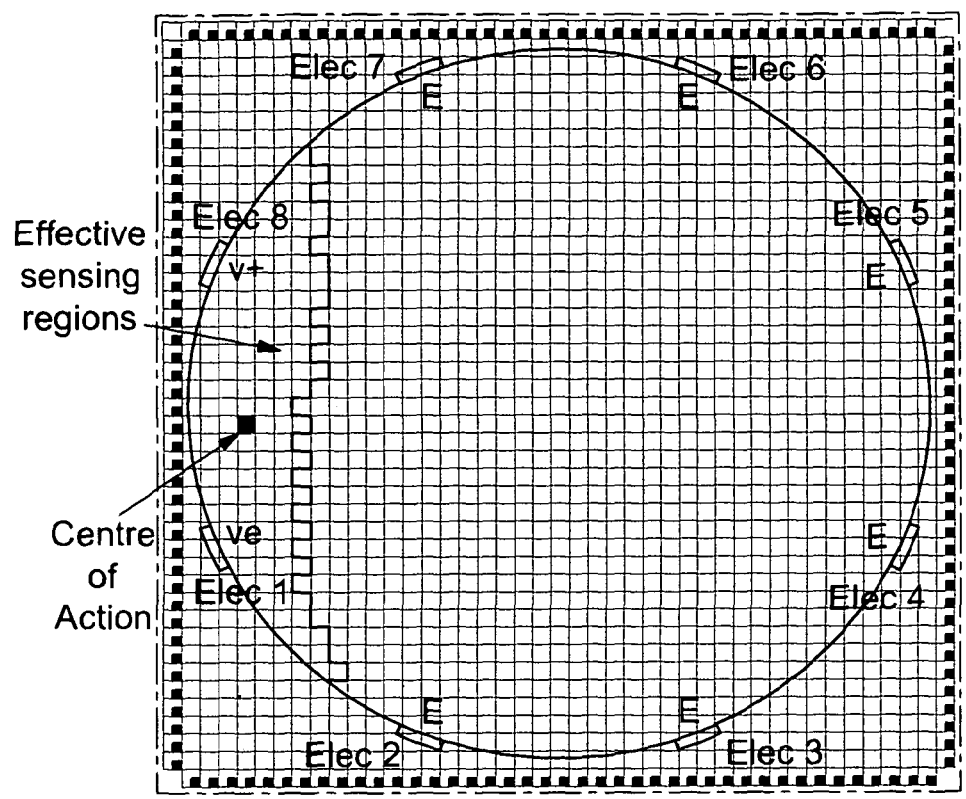
FIG. 16 depicts an electrode potential rotational pattern showing the resultant effective sensing region and centre of action for an 8 electrode system of an ICC measuring means.

With reference to FIG. 16 suppose that the electrical potential formerly applied to each electrode is now applied to the adjacent electrode in the clockwise direction (e.g. the potential formerly applied to electrode 'Elec1' is now applied to electrode 'Elec8', the potential formerly applied to electrode 'Elec2' is now applied to electrode 'Elec1', etc). The new EPRP is $I_2$ and the new effective sensing region is $R_{I,2}$ which has the same shape as $R_{I,1}$ but which is rotated by $$\frac{360°}{\tilde{N}}$$

in the clockwise sense with respect to $R_{I,1}$. The centre of action of $R_{I,2}$ is denoted $C_{I,2}$ and the local volume fractions $\alpha_d$ and $\alpha_c$ of the dispersed and continuous phases at $C_{I,2}$ can be determined as described above. For an $\tilde{N}$ electrode system, by rotating the effective sensing region $\tilde{N}$ times, the values of $\alpha_d$ and $\alpha_c$ can be determined at the $\tilde{N}$ spatial locations $C_{I,n}$ (n=1 to $\tilde{N}$) in the flow cross section.

Let us now suppose that a different sequence of potentials denoted sequence II is used (e.g. ve, V$^+$, ve, E, E, E, E, E). Using the methods outlined above this will enable $\alpha_d$ and $\alpha_c$ to be determined at an additional N spatial locations $C_{II,n}$ (n=1 to $\tilde{N}$). The number of sequences of potentials can be increased until the values of $\alpha_d$ and $\alpha_c$ are known at the required number of spatial locations in the flow cross section. For example, if three sequences of potentials (I, II and III) are used the values of $\alpha_d$ and $\alpha_c$ will be known at the 3$\tilde{N}$ locations $C_{I,n}$, $C_{II,n}$, and $C_{III,n}$ (n=1 to $\tilde{N}$).

6b. Local Dispersed Phase Velocity Measurement Using the ICC

In an array $\tilde{B}$ the instantaneous local dispersed phase volume fraction measured at point $C_{I,1}$ at time t (using the methods outlined above) is denoted $\alpha_{d,\tilde{B}}(t)$. Let us suppose that at corresponding point $C_{I,1}$, in array $\tilde{A}$ (which is located upstream of array $\tilde{B}$) the instantaneous local dispersed phase volume fraction is $\alpha_{d,\tilde{A}}(t)$. A cross correlation function $R_{\tilde{A}\tilde{B}}(\tau)$ can be defined as $$R_{\tilde{A}\tilde{B}}(\tau) = \frac{1}{T}\int_{t=0}^{\tau=T} \alpha_{d,\tilde{A}}(t)\alpha_{d,\tilde{B}}(t+\tau)dt \tag{a5}$$

The function $R_{\tilde{A}\tilde{B}}(\tau)$ has a well defined peak at $\tau = \tau_p$ representing the local transit time of particles of the dispersed phase between planes $\tilde{A}$ and $\tilde{B}$ at the spatial location $C_{I,1}$ in the flow cross section. The local dispersed phase velocity $v_d$ at $C_{I,1}$ is then given by $$v_d = \frac{L}{\tau_p} \tag{a6}$$

where L is the axial separation of the electrode arrays. By repeating the process for points $C_{I,n}$, $C_{II,n}$ and $C_{III,n}$ (n=1 to $\tilde{N}$) (for example) the local dispersed phase velocity can be determined at the required number of spatial locations in the flow cross section.

Measurements of $\alpha_d$, $\alpha_c$ and $v_d$ using the ICC device (as described above) are calculated using the same processing means as that used in the flow meter for determining the axial velocity profile.

It should be noted that the measurements that are made using the ICC device could alternatively be made using a high speed 'Dual-Plane Electrical Resistance Tomography' (DP-ERT) device.

7. A Third Example of a Flow Meter

The following description relates to a flow meter that is suitable for monitoring the flow of each phase of a three phase fluid. The fluid comprises a conducting continuous phase and two dispersed phases. The flow meter further comprises an impedance cross correlation measuring means (ICC) and a density measuring means (DM) so as to create a three phase flow meter.

One specific (but not exclusive) embodiment of such a three phase flow meter would be for measuring the volumetric flow rates of oil, water and gas in a vertical pipeline, in which water is the continuous phase and where the oil and gas are dispersed phases. In this particular example, the density meter could simply consist of a vertical section of pipe (of typical length 1 m) with pressure tapings separated by a vertical distance $L_{DM}$. A differential pressure measurement $\Delta P_{DM}$ made between the pressure tapings, compensated, for the effects of frictional pressure loss resulting from the motion of the multiphase mixture, enables the mean density $\rho_m$ of the multiphase to be measured using $$\rho_m = \frac{\Delta P_{DM}}{\tilde{g} \, L_{DM}} \qquad (b1)$$

where $\tilde{g}$ is the acceleration of gravity. [Note that a number of alternative techniques are readily available to measure $\rho_m$]. The mean volume fraction $\lambda_w$ of the water in the flow cross section can be determined using the ICC device described in the two phase flow meter using $$\lambda_w = \frac{1}{A} \sum_{i=1}^{N} \left(1 - \alpha_d^{ICC,i}\right) A_i \qquad (b2)$$

where $A_i$ is the area of the $i^{th}$ region (of N) into which the flow cross section is divided, A is the total pipe cross sectional area and $\alpha_d^{ICC,i}$ is the local volume fraction of the combined, non-conducting dispersed phases (oil and gas) in the $i^{th}$ region as measured by the ICC device. The mean volume fraction $\lambda_o$ of the oil in the cross section can now be obtained using $$\lambda_o = \frac{(\rho_m - \rho_g) - \lambda_w(\rho_w - \rho_g)}{\rho_o - \rho_g} \qquad (b3)$$

where $\rho_o$, $\rho_w$ and $\rho_g$ respectively represent the densities of the oil, water and gas at the position of the three phase flow meter. It is necessary to calculate $\rho_g$ using simple, auxiliary measurements of the absolute pressure and absolute temperature of the multiphase mixture at the position of the multiphase flow meter. The mean volume fraction $\lambda_g$ of the gas in the cross section can now be obtained using $$\lambda_g = 1 - \lambda_w - \lambda_o \qquad (b4)$$

The volumetric flow rate $Q_w$ of the water can be obtained using $$Q_w = \sum_{i=1}^{N} \left(1 - \alpha_d^{ICC,i}\right)\left(v_w^{IEF,i}\right) A_i \qquad (b5)$$

where $v_w^{IEF,i}$ is the water velocity, as measured by the flow meter, in the $i^{th}$ region into which the flow cross section is divided. If it is now assumed that the oil and water are well mixed and flow homogeneously such that the mean oil velocity is the same as the mean water velocity then the mean oil velocity $\bar{v}_o$ can be calculated as follows;

$$\bar{v}_o = \frac{\sum_{i=1}^{N} \left(1 - \alpha_d^{ICC,i}\right) A_i v_w^{IEF,i}}{A \lambda_w} \qquad (b6)$$

The oil volumetric flow rate $Q_o$ can now be obtained using $$Q_o = \lambda_o \bar{v}_o A \qquad (b7)$$

The gas is not finely dispersed in the multiphase mixture in the way that the oil is finely dispersed in the water and so the mean gas velocity $\bar{v}_g$ can be obtained as follows using the ICC device $$\bar{v}_g = \frac{1}{A} \sum_{i=1}^{N} v_g^{ICC,i} A_i \qquad (b8)$$

where $v_g^{ICC,i}$ is the local gas velocity, in the $i^{th}$ region into which the flow cross section is divided, as measured by the ICC device using the cross correlation technique described in the two phase flow meter. The gas volumetric flow rate can now be obtained using $$Q_g = \lambda_g \bar{v}_g^{ICC} A \qquad (b9)$$

The features of the invention are applicable to all aspects of the invention and may be used in any combination.

Through out the description and claims of this specification, the words "comprise" and "contain" and variations of the words, for example "comprising" and "containing", means "including but not limited to, and is not intended to (and does not) exclude other moieties, additives, components, integers or steps.

Throughout the description and claims, the singular encompasses the plural unless the context otherwise requires. In particular, where the indefinite article is used, the specification is to be understood as contemplating plurality as well as singularity, unless the context requires otherwise.

Features, integers, characteristics or groups described in conjunction with a particular aspect, embodiment or example, of the invention are to be understood to be applicable to any other aspect, embodiment or example described herein unless incompatible therewith.

The invention claimed is:

1. An electromagnetic flow meter for monitoring the flow of a conducting fluid comprising:
   a flow tube;
   a means for generating a magnetic field across the flow tube cross-section so that a voltage is induced in the conducting fluid as it flows through the flow tube;

an array of voltage detection electrodes configured to divide the flow cross-section into multiple pixel regions and measure the induced voltage in each pixel region; and processing means for determining an axial velocity profile of the conducting fluid by calculating the local axial velocity of the conducting fluid in each pixel region based upon the induced voltage in each pixel region, a weight value, and a pixel area for each pixel region.

2. The flow meter of claim 1, wherein the flow tube comprises a non-electrically conducting body.

3. The flow meter of claim 1, wherein the flow tube comprises: an outer body portion formed from a low magnetic permeability material; and an inner body portion formed from a non-electrically conducting material.

4. The flow meter of claim 1, wherein the flow tube further comprises an annular liner having a conductivity that is generally the same as the conductivity of the conducting fluid.

5. The flow meter of claim 1, wherein the means for generating a magnetic field comprises a Helmholtz coil having a pair of coils arranged symmetrically on opposing sides of the flow tube.

6. The flow meter of claim 5, wherein the means for generating a magnetic field is configured to generate a substantially uniform magnetic field across the flow tube cross section.

7. The flow meter of claim 5, wherein the means for generating a magnetic field is configured to generate a non-uniform magnetic field across the flow tube cross-section.

8. The flow meter of claim 5, wherein the means for generating a magnetic field is configured to generate a magnetic field having a single magnetic field projection (P=1).

9. The flow meter of claim 5, wherein the means for generating a magnetic field is configured to successively generate multiple magnetic fields, each magnetic field having a different magnetic field projections (P>1).

10. The flow meter of claim 1, whereby the array of electrodes comprises E electrodes that are configured to divide the flow cross-section up to M pixel regions and measure up to M induced voltages in the conducting fluid when a single magnetic field projection is applied, whereby M=E−1.

11. The flow meter of claim 10, wherein the means for generating a magnetic field is configured to successively generate multiple magnetic fields, each magnetic field having a different magnetic field projections (P>1), and wherein the array of E electrodes is configured to divide the flow cross section into N pixel regions and measure up to N induced voltages in the conducting fluid when multiple magnetic field projections are applied, whereby N=PM.

12. The flow meter of claim 1, wherein the processing means is configured to calculate the local axial velocity of the conducting fluid in each said pixel region using the measured induced voltage for each said pixel region and predetermined weight functions for each said pixel region.

13. The flow meter of claim 12, wherein the processing means is configured to calculate the volumetric flow rate of the conducting fluid.

14. The flow meter of claim 13, whereby when the conducting fluid is a conducting single phase fluid, the processing means is configured to calculate the volumetric flow rate using the local axial velocity of the conducting fluid in each pixel region.

15. The flow meter of claim 13, whereby when the conducting fluid is a conducting continuous phase of a multi phase fluid, the processing means is configured to calculate the volumetric flow rate using the local axial velocity in each pixel region and local concentration distribution of the conducting fluid.

16. The flow meter of claim 15, further comprising means for measuring the local concentration distribution of the conducting continuous phase of the multi phase fluid and optionally the local concentration distribution of the one or more dispersed phases of the multiphase fluid.

17. The flow meter of claim 16, wherein the means for measuring the local concentration distribution is configured to use an electrical resistance tomography technique or an impedance cross correlation technique.

18. The flow meter of claim 16, further comprising means for determining the mean density of the multi phase fluid and means for determining the density of each phase of a multi phase fluid.

19. The flow meter of claim 16, wherein the flow meter is configured to determine the axial velocity profile, and optionally the volumetric flow rate, of each phase of a multi phase fluid.

20. The flow meter of claim 12, wherein the processing means comprises means for controlling the operation of the means for generating the magnetic field.

21. The flow meter of claim 20, wherein the means for generating a magnetic field comprises a Helmholtz coil having a pair of coils arranged symmetrically on opposing sides of the flow tube, and wherein the means for controlling the operation of the means for generating the magnetic field comprises a coil excitation circuit for controlling the flow of current to the Helmholtz coil.

22. The flow meter of claim 21, wherein the processing means comprises a temperature compensating circuit to compensate for the change in the resistance of the Helmholtz coil as the temperature varies.

23. The flow meter of claim 12, wherein the processing means comprises means for collating the induced voltages.

24. The flow meter of claim 23, wherein the processing means comprises a control circuit to compensate for the effects of any unwanted voltage components.

25. A method for monitoring the flow of a conducting fluid comprising:
generating an induced voltage in the conducting fluid;
measuring the induced voltage in multiple pixel regions across the flow cross-section; and
determining an axial velocity profile of the conducting fluid by calculating the local axial velocity of the conducting fluid in each pixel region based upon the induced voltage in each pixel region, a weight value, and a pixel area for each pixel region.

26. The method of claim 25, wherein calculating the local axial velocity of the conducting fluid in each pixel region comprises using the measured induced voltages and predetermined weight functions.

27. The method of claim 25, further comprising determining the weight functions for each pixel in the flow cross-section prior to monitoring the flow of the conducting fluid.

28. The method of claim 25, further comprising applying a magnetic field with a single magnetic field projection across the conducting fluid so as to induce a voltage in the conducting fluid, whereby the magnetic field is a uniform magnetic field or a non-uniform magnetic field.

29. The method of claim 28, further comprising successively applying multiple magnetic fields across the conducting fluid, whereby each magnetic field has a different magnetic field projection.

30. The method of claim 25, further comprising determining the volumetric flow rate of the conducting fluid.

31. The method of claim 30, wherein, when the conducting fluid is a conducting single phase fluid, determining the volumetric flow rate of the conducting fluid comprises using the axial velocity profile of the conducting fluid.

32. The method of claim 30, wherein when the conducting fluid is a conducting continuous phase of a multiphase fluid, determining the volumetric flow rate of the conducting fluid comprises using the axial velocity profile and local concentration distribution of the conducting fluid.

33. The method of claim 32, further comprising measuring the local concentration distribution of the conducting fluid and optionally measuring the local concentration distribution of one or more dispersed phases.

34. The method of claim 33, wherein measuring the local concentration distribution of the conducting fluid comprises using an electrical resistance tomography technique or an impedance cross correlation technique.

35. The method of claim 33, further comprising determining the axial velocity profile, and optionally the volumetric flow rate, of each phase of the multiphase fluid.

36. The method of claim 25, further comprising controlling the magnetic field.

37. The method of claim 36, wherein when the magnetic field is generated by a Helmholtz coil, the controlling of the magnetic field comprises controlling the flow of current to the Helmholtz coil.

38. The method of claim 36, further comprising compensating for a variation in the magnetic field due to temperature fluctuations.

39. The method of claim 25, further comprising collating the induced voltages.

40. The method of claim 39, further comprising compensating for the effects of any unwanted voltage component.

* * * * *